INVENTOR.
DOUGLAS G. SHEARER
WILLIAM W. BROCKWAY,
BY
ATTORNEY.

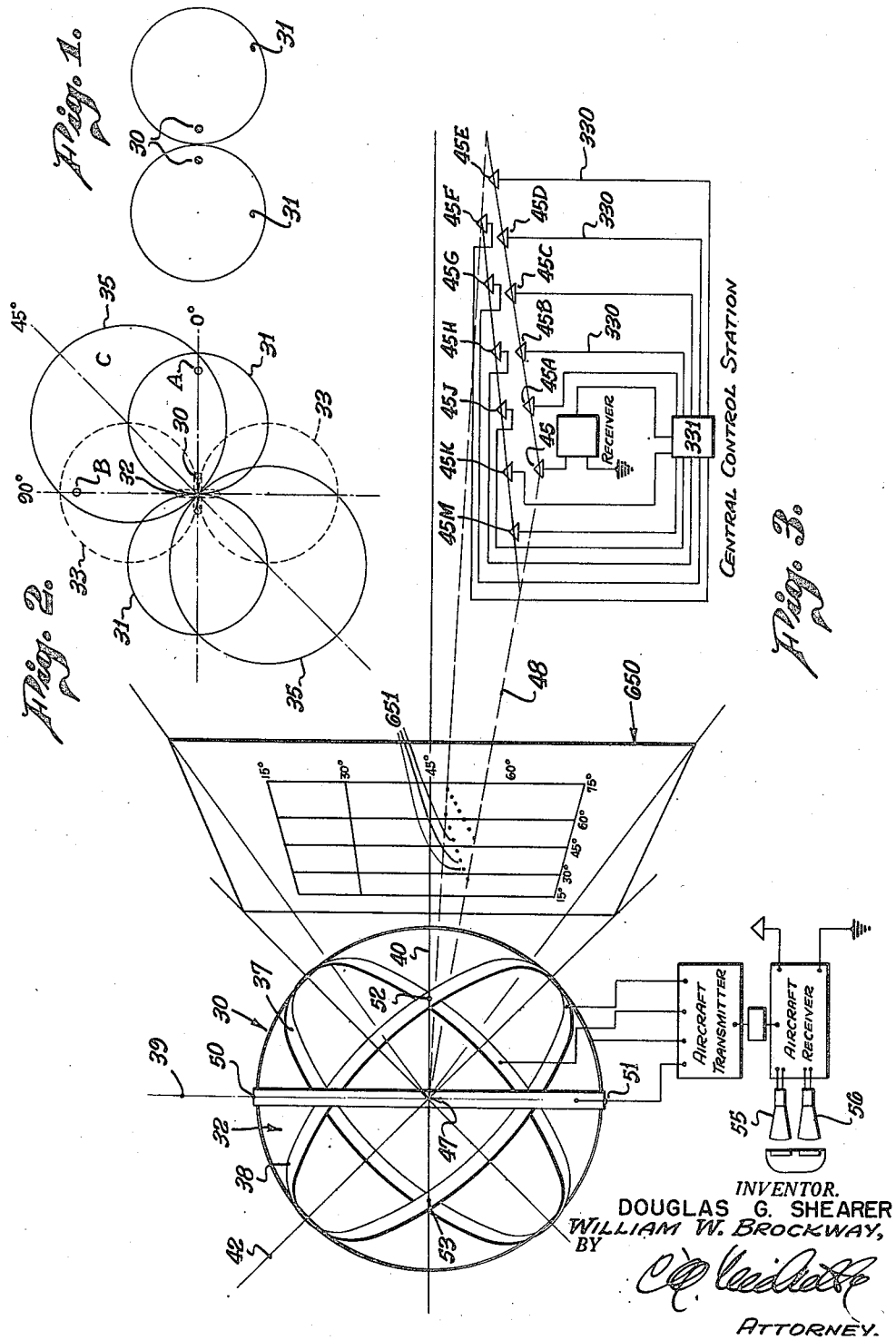

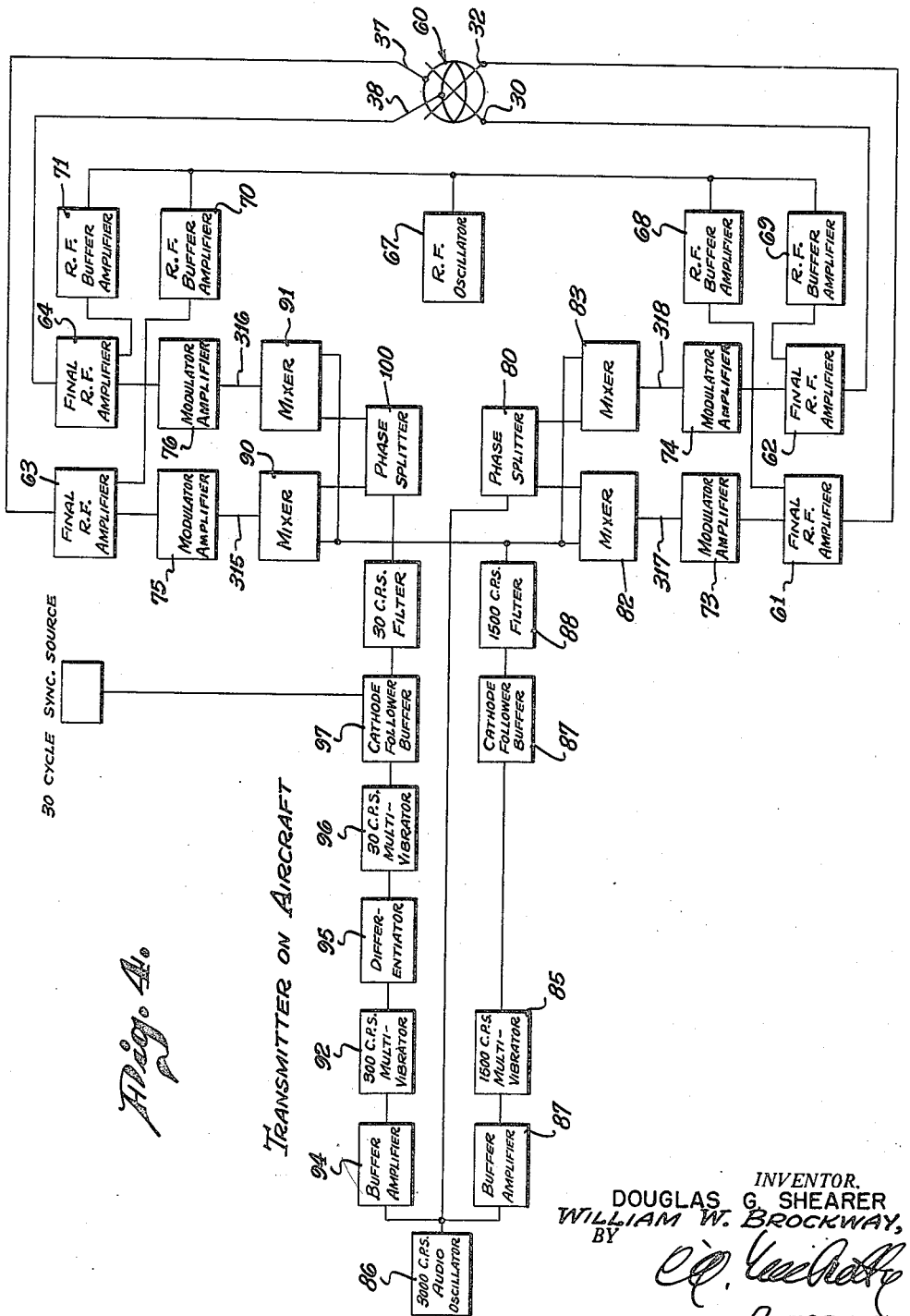

Aug. 25, 1953     W. W. BROCKWAY ET AL     2,650,359
RADIO NAVIGATION SYSTEM
Filed March 20, 1950     10 Sheets-Sheet 4

INVENTOR.
DOUGLAS G. SHEARER
WILLIAM W. BROCKWAY,
BY

ATTORNEY.

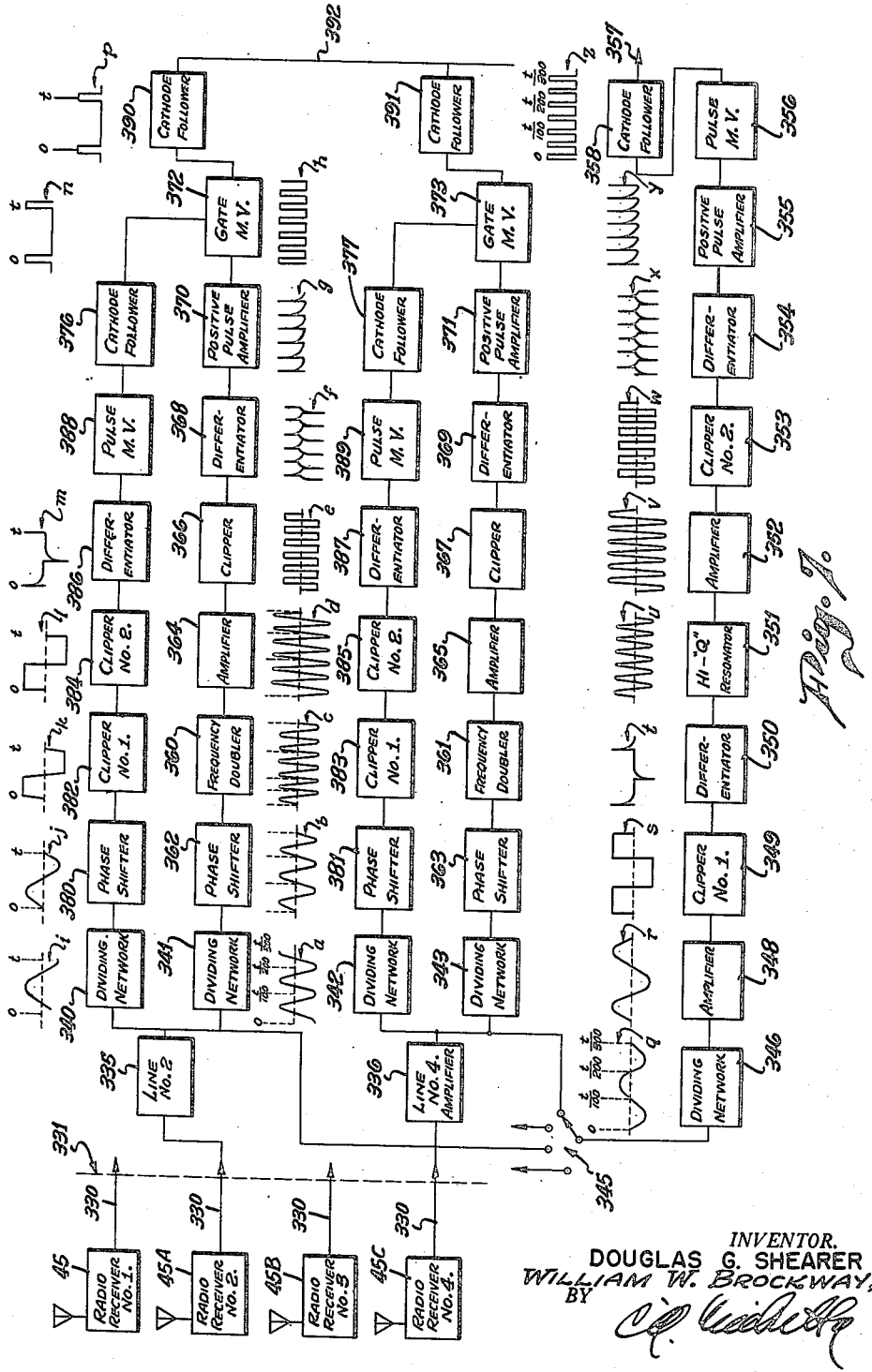

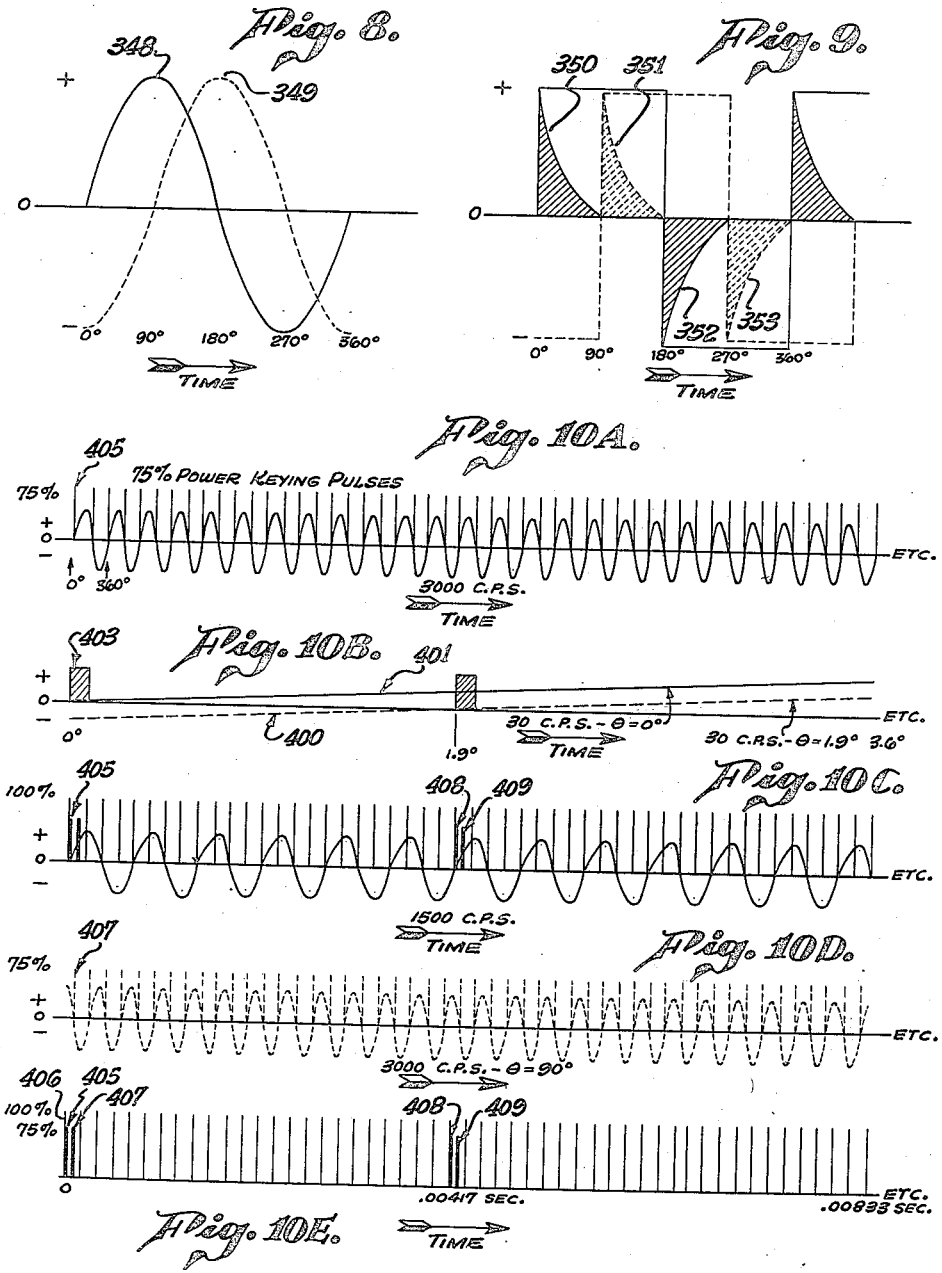

Aug. 25, 1953     W. W. BROCKWAY ET AL     2,650,359
RADIO NAVIGATION SYSTEM
Filed March 20, 1950     10 Sheets-Sheet 7

*Fig. 11.*

INVENTOR.
DOUGLAS G. SHEARER
WILLIAM W. BROCKWAY,
BY
ATTORNEY.

Aug. 25, 1953

W. W. BROCKWAY ET AL 2,650,359

RADIO NAVIGATION SYSTEM

Filed March 20, 1950

INVENTOR.
DOUGLAS G. SHEARER
WILLIAM W. BROCKWAY,
BY

ATTORNEY.

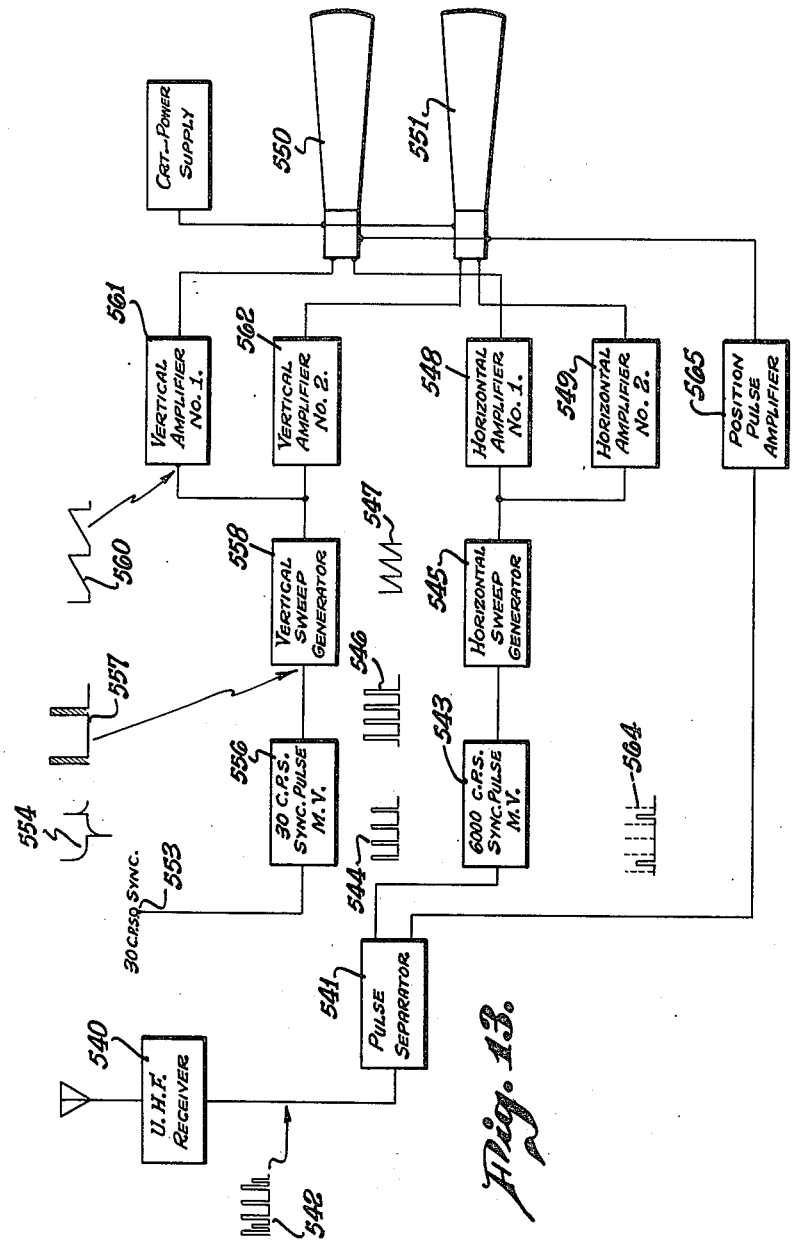

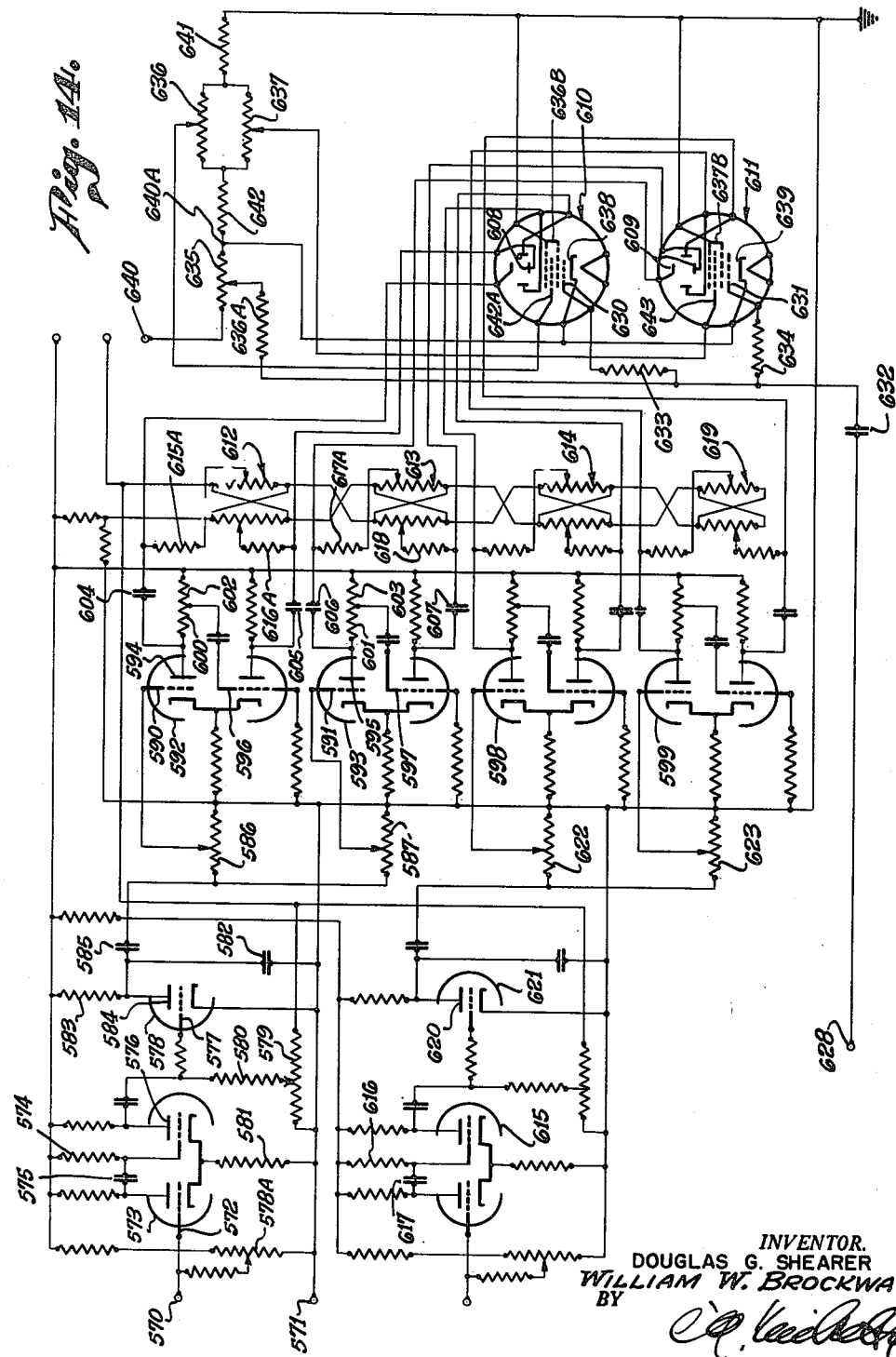

Patented Aug. 25, 1953

2,650,359

UNITED STATES PATENT OFFICE 2,650,359

RADIO NAVIGATION SYSTEM

William W. Brockway and Douglas G. Shearer, Los Angeles, Calif.

Application March 20, 1950, Serial No. 150,681

20 Claims. (Cl. 343—112)

This invention relates generally to improved systems and methods for space scanning by means of Hertzian waves. More particularly, the invention relates to an aircraft landing system and method employing space scanning wherein a properly oriented perspective view of selected points identifying or defining a landing strip or airport is automatically produced and may be viewed by the pilot as he approaches the landing strip or airport in order to land an aircraft. The system and methods of the present invention operate irrespective of weather conditions, and even though ceiling zero and visibility zero weather conditions prevail, the pilot may land an aircraft on the landing strip just as accurately and easily as he could under full visibility, maximum ceiling conditions.

The system and method of this invention has a tremendous advantage over any and all of the numerous prior art attempts to solve the blind landing problem, a major problem of air transport. This advantage lies in the fact that, when the present invention is used, the pilot lands the aircraft in his accustomed manner through the use of his sensory perception channels in the accustomed manner in which most of his previous training has made him adept. In other words, the pilot, when being trained, learns to fly an airplane by visual contact and take-offs and landings are accomplished primarily through visual perception and orientation. Through repeated experience this becomes second nature to the pilot and is always the easiest and most natural way for him to land an airplane. Although later he generally takes training to fly entirely by instrument, this is not a natural, direct means of perceiving the situation, since the information takes devious routes before it finally becomes a concept in the brain and is subject to errors.

This can easily be understood when it is considered that a pilot of a large, modern, transport airplane is required to examine a very large number of instruments frequently in order to ascertain a great number of important facts. For example, air speed, engine speed, turn and bank indicators, altitude, compass, and many other factors too numerous to mention here must be observed frequently in order to ascertain position and be assured that no dangerous situation is developing. A number of such instruments indicating a number of variables must be utilized and correlated to inform the pilot of a rapidly changing situation. This minimum number of instruments or controls is constantly increasing as the size, complexity, and speed of aircraft grows, and, in fact, it has, at the present time, reached a point where it presents a considerable psychological problem for the pilot. It has become such an important problem that both the Army and Navy have conducted and are conducting research programs aimed toward simplifying the problem of ready comprehension by the pilot of all of the instruments and variables represented thereby.

Indeed, at the present time, the majority of accidents occurring to airplanes flown by the commercial transport airlines, as ascertained by the official investigators thereof, is ascribed to "pilot error." In other words, the majority of accidents are not caused by failure of equipment, but by psychological failure of the pilot. This is brought about by a number of factors, prominent among which is the complex instrumentation which must be visually simultaneously observed, evaluated, and correlated by the pilot.

Through the use of the present system and methods, a pilot needs no instrument flying experience at all, since he will be landing the airplane under conditions of apparent visual contact with the airport.

Various prior art systems to aid in blind landing have been devised in an attempt to solve this problem. However, they all have various disadvantages. For example, one prominent prior art system commonly known as I. L. S. (Instrument Landing System) has been widely used but is deficient in some respects and does not solve the problem. In this prior art system the pilot is guided in his landing effort under poor visibility conditions entirely by an instrument which he must watch constantly and which is of a centering type. In other words, as he deviates to the left or right, or up or down, from the landing glide path defined by a glide-path beam sent up from the airport by the Instrument Landing System, the instrument moves off center, indicating to the pilot that he must redirect the airplane toward the right or left, or up or down, until the instrument is again centered, when he knows that he is again following the glide path defined by the glide-path beam. This is an extremely unnatural way of perceiving the relative orientation, including altitude and attitude of the airplane with respect to the airport.

Furthermore, the information conveyed by the instrument is somewhat inaccurate, since the beam has definite dimensions and therefore the aircraft's position is not defined with great precision. The actual spatial position of the glide-path beam is not constant at all times and varies under different environmental conditions. This is especially true at the precise time when the system becomes vitally important, namely during storms, bad weather conditions, and during periods of actively changing meteorological conditions. This and other prior art systems do not give accurate information as to the relative attitude of the aircraft with respect to the landing strip. While such systems are of help under conditions of poor visibility, they are not actually capable of accurately guiding the pilot into a safe landing on the airstrip under zero visibility and zero ceiling conditions. About the most such systems are capable of is to guide the pilot while the airplane is at a considerable altitude and descending along the glide path until the aircraft approaches the landing strip closely enough and is at a sufficient low altitude so that the pilot may actually see the airport and make the actual landing on the airstrip by visual contact with the field, aided, perhaps, by light beacons appropriately positioned along the landing strip. The last few hundred feet of descent prior to the wheels of the airplane contacting the landing strip should be made with at least some visual contact with the airport, even if visibility is poor. The reason for this is that the I. L. S. is not a method which precisely defines the positions and degree of directional error of the airplane, and one can well imagine that wrongly etsimating the aircraft's altitude or attitude by even a slight amount, when landing at relatively high speed, would be quite adequate to destroy the airplane and all occupants.

Another prior art system is known as G. C. A. (Ground Controlled Approach). This system employs radar means on the ground at the airport for ascertaining the position of the approaching aircraft on the radar screen. The operator of the radar means on the ground constantly verbally directs the pilot of the approaching aircraft in his approach to the airport by radio while simultaneously watching the radar screen to observe the movement of the aircraft. This continues until he has "talked" the pilot to a safe landing. Not only is it difficult to blindly follow verbal instructions (especially when one is in a dangerous situation and has no visual perception of the situation), but the pilots (in general) resent direction from a land-based operator. The system (in common with the others) gives no information as to the relative attitude of the airplane with respect to the ground, merely determining the location of the airplane with respect to the ground for the ground operator.

Teleran is another system which has been proposed in an attempt to solve the above-mentioned difficulties and consists of the use of a system somewhat like the hereinabove-described G. C. A. plus a television transmitter on the ground arranged to transmit visual pictures, images, and representations to a television receiver carried in the approaching aircraft which translates same into a visual reproduction which may be viewed by the pilot of the approaching aircraft and used in landing the aircraft. Furthermore, the radar image showing the relative position of the approaching aircraft with respect to the airport may be transmitted by television from the ground to the approaching aircraft in superimposed relationship to a map or other reproduction of the airport or landing strip, whereby the image viewed by the pilot of the approaching aircraft may show the position of his aircraft as it moves relative to a fixed reproduction of the airport and he may guide himself to a landing in accordance with the intelligence conveyed.

This is potentially a considerable improvement over the G. C. A. system in certain respects, since visual perception is utilized and the pilot does not have to follow verbal instructions from an operator on the ground. However, it should be noted that the pilot does not see a reproduction of the airport in proper spatial position and perspective and therefore visual contact conditions do not actually prevail. Furthermore, no information as to the attitude of the aircraft is conveyed. While the system allows the pilot to use his eyes, the view that he perceives is of limited value since it is not the normal type of view to which he is accustomed in landing the airplane under visual contact conditions, but rather conveys the information in a reciprocal, unnatural way, requiring interpretation. The relative position of the pip on the radar screen corresponding to the relative position of his airplane with respect to the airport can be interpreted as a distance reading and the airplane's altitude can also be determined. This can be done by actual measurement or by relative comparison with respect to the reproduction of the superimposed reproduction of the airport transmitted to the approaching aircraft, but it is quite different from actually seeing the airport or selected points identifying the airport in its true position and perspective as though viewed from the position and attitude of the approaching aircraft, such as the present invention contemplates.

A few prior art attempts to scan space by means of Hertzian waves have been made, but all such systems that we are aware of have been failures by reason of major defects. Certain such systems have employed high-directional transmitting antennae carried on an aircraft and adapted to scan space with Hertzian waves by mechanical rotation. In such systems each of a plurality of spaced Hertzian wave radio receiving means on the ground would receive the Hertzian waves when the transmitting antenna was directed at said receiver. The various signals from the various receivers would then form the components of a signal carrying intelligence as to the relative position of the various receivers with respect to the transmitting antenna. Such a system is partially ineffective, since it is extremely difficult to provide a beam of Hertzian waves radiating from a transmitting antenna directionally which is narrow enough or subtends a small enough angle to provide adequate definition and accuracy. Also the rate of mechanical movement is limited due to mechanical limitations and the rate of movement of the plane cannot be ascertained in a continuous manner.

It has also been proposed that Hertzian waves be radiated from the aircraft and highly directional Hertzian wave receivers be positioned on the ground at the airport and mechanically rotated to scan the area in which the approaching aircraft lies and to correlate the signals from the various receivers into a signal carrying intelligence as to the relative position of the approaching airplane with respect to each of the receivers. Such systems are impractical since the receivers would have to be capable of handling an enormous band width under such operating conditions.

Generally speaking, the system of the present invention comprises means for generating and directionally radiating a complex Hertzian wave pattern including at least two separable components which are phase-modulated in at least two different directions in accordance with angular coordinates in said directions with respect to the radiating point and spaced Hertzian wave receiving means remotely positioned with respect to Hertzian wave origin and arranged to receive and separate the separable, angular position, phase-modulated Hertzian wave components and produce a signal carrying intelligence as to the angular coordinates of wave reception with respect to wave origin.

In the preferred form of the system of this invention, the Hertzian wave origin is singular and may be carried by a moving vehicle, such as an airplane. It may take the form of an antenna array consisting of several directional antennae. The Hertzian wave receiving means comprises a plurality of radio receivers spacedly positioned in fixed positions with respect to the objective toward which the moving vehicle is traveling, such as an airport, for example. Furthermore, in the preferred form of the system of the present invention, a third, standard reference signal, which is non-phase-modulated in accordance with angular coordinates of reception point with respect to origin, is also radiated from the origin or antennae. It is also received at at least one (although usually a plurality of receivers are employed) of the remote radio receivers and correlated with the signal carrying intelligence corresponding to the angular coordinates of each of the radio receivers with respect to the transmitting antennae. In the preferred form of the present invention means are provided for returning the intelligence-carrying signal to the aircraft as well as means carried by the aircraft for transforming the returned signal into a visually observable image of the receiver locations. The image viewed by the pilot is a perspective of the locations of the receivers as they would appear from the attitude of the aircraft. When the receivers are located at the boundaries of a field and at known obstacles (tower, stack, power line, building, etc.), the pilot can readily recognize the field, and land as if under full, direct night-lighted view conditions, without the necessity of correlating many instrument readings and without being "talked down" by a landsman.

The method of the present invention consists generally of scanning space by generating and radiating a complex Hertzian wave pattern having measurably different characteristics at each reception point or points in accordance with the angular coordinates of said reception point or points with respect to the origin of the Hertzian wave pattern. The preferred form of the method of this invention combines signals received at a plurality of spatially different points and correlates them into a signal carrying intelligence corresponding to the angular coordinates of the reception points, transmits said signal to the point of origin which, in the usual form of the invention, is positioned on a moving aircraft, and translates the signal into a visually observable reproduction of the reception points.

In its ultimate form, the invention contemplates the production of a perspective image which can be viewed without ocular convergence (such as occurs when a picture is viewed at a relatively short distance). When ocular convergence takes place, the observer knows that the image is in a plane but a short distance from him and he does not see the image components in perspective and depth. By eliminating convergence, the pilot observes the image components in perspective and depth, as if the components were at their actual distance from him, permitting the pilot to react to their movement and approach in a normal, rapid, and facile manner without mental interpretation or strain.

The equipment used in the system is relatively simple and automatic; the weight of apparatus carried by an aircraft is negligibly small; human error and time lag is reduced to a minimum when the method of this invention is utilized.

With the above points in mind, it is an object of the present invention to provide improved apparatus and method for space scanning by means of Hertzian waves.

A further object of this invention is to provide a Hertzian wave space-scanning system in which a complex Hertzian wave pattern is radiated into space in such manner that separable characteristics of said wave pattern develop according to angular coordinates of the reception point thereof.

It is an object of the present invention to provide an improved system and method whereby the pilot of an aircraft may view in true perspective the natural visual image of the outlines, boundaries, or limits of an airport, or a selected landing strip thereon, or any other significant points or obstacles, such as the tops of hangars, water towers, or chimneys, or other dangerous obstacles, so that his natural vision is effectively restored to a degree that a safe and normal landing can be effected during conditions of minimum visibility and ceiling.

An object of this invention is to provide means and methods for producing a perspective reproduction of selected points identifying a landing strip which is presented to the pilot of an aircraft in a manner minimizing ocular converging and focusing effort and preserving similar viewing angles to the actual viewing angles of the selected points identifying the landing strip from the attitude and altitude of the aircraft, whereby the reproduction appears to the pilot to be a three-dimensional, true perspective view of the selected points.

Another object of this invention is to provide a Hertzian wave space-scanning system in which a complex Hertzian wave pattern is radiated into space in such manner that separable characteristics of said wave pattern develop according to angular coordinates of the reception point thereof and for correlating signals received at a plurality of spaced points into a combined signal carrying intelligence as to the relative angular coordinates of various reception points with respect to the origin of the complex Hertzian wave pattern and for retransmitting said intelligence-carrying signal to a point adjacent the origin of the complex Hertzian wave pattern and translating same into a visual reproduction of the various points of reception of the complex Hertzian wave pattern.

Another object of the present invention is to provide an improved system and method whereby the pilot of an aircraft may obtain a visual image in natural, binocular, or stereoscopic perspective of the outlines, boundaries, or limits of an airport, or of selected points identifying an airport, in such a manner that a safe or normal landing may be effected during minimum visibility conditions.

A further object of the present invention is to provide an improved system and method wherein angular position, phase-modulated, Hertzian wave components are radiated from a plurality of selected points identifying a landing strip which are received on an approaching aircraft and correlated so as to produce a signal carrying intelligence as to the relative angular position of the aircraft with respect to the various selected points identifying the landing strip and translating said signal into a visual reproduction in true perspective from the position of the aircraft of the selected points identifying the landing strip whereby the pilot of the aircraft may land the aircraft under apparent visual contact conditions even though minimum visibility conditions actually prevail.

A further object of the present invention is to provide a system for producing a visually observable image in an aircraft approaching a landing strip corresponding to the reproduction of the landing strip from a selected point of view effectively tilted in accordance with the position of the approaching aircraft with respect to the landing strip.

A still further object of the present invention is to provide the pilot of an aircraft approaching a landing strip with a visually observable image corresponding to a view of a reproduction of the landing strip taken by a television camera positioned with respect to the reproduction of the landing strip in accordance with the position of the approaching aircraft with respect to the landing strip.

Another object of the present invention is to provide an improved system and apparatus for accurate landing of aircraft under unfavorable conditions incorporating means for producing a scanning radiation pattern and beacon receivers with return transmission arranged to produce a picture upon the face of a cathode ray tube of the landing area outlined in lights in perspective as it would be viewed from the aircraft's position.

Another object is to provide a means of using the radio spectrum to greatest advantage with respect to signal to noise ratio and band width requirements in accomplishing the phase scan objective and transmission back to the moving vehicle during adverse weather conditions.

Other and allied objects will become apparent to those skilled in the art from an examination, study, and perusal of the specification, illustrations, and appended claims. To facilitate understanding, reference will be had to the appended drawings, in which:

Fig. 1 is a drawing illustrating a figure-eight-type radiation field pattern of a loop antenna as viewed through the center section of the loop and will be used in describing some features of the principles underlying the present invention.

Fig. 2 is an illustrative drawing showing the individual figure-eight radiation patterns produced by two separate loop antennae positioned about a common center but lying in mutually perpendicular planes and energized with equal energies. Fig. 2 also illustrates the resultant radiation field pattern produced by the combination of the individual field patterns of the two separate antennae which is also of figure-eight form. This drawing will also be used in describing the general principles underlying the present invention.

Fig. 3 is a perspective view of one illustrative form of antennae system or array which may be employed to direct a complex Hertzian wave pattern into a selected space segment, such as an airport.

Fig. 4 illustrates in block diagrammatic form one exemplary type of fully electronic arrangement which may be employed for generating and producing two separable components which are directed by transmitting antennae means into a selected space segment in accordance with one method of carrying out the invention.

Fig. 7 is a block diagrammatic drawing illustrative of a spaced radio receiver means and one form of dividing networks and correlating arrangement arranged to produce a signal carrying intelligence as to the angular coordinates of the various radio receivers and means for keying a return high-frequency transmitter with the intelligence-carrying signal for producing and transmitting back to the aircraft a video signal carrying intelligence corresponding to the relative positions of the various radio receivers.

Figs. 8 and 9 are illustrations of wave forms and will be used in explaining the transformations which occur in the present apparatus in making phase shift comparisons or in correlating the signals from the various radio receivers and producing a signal carrying intelligence.

Figs. 10A, 10B, 10C, 10D and 10E are graphical representations of conditions, as a function of time, on the same time scale which occur in portions of the present system and will be used in explaining the operation thereof.

Fig. 11 is an electrical schematic circuit diagram of one illustrative form of positioned pulse creating and keying equipment utilized in correlating the Hertzian wave components received by one of the plurality of spaced radio receivers.

Figure 12:
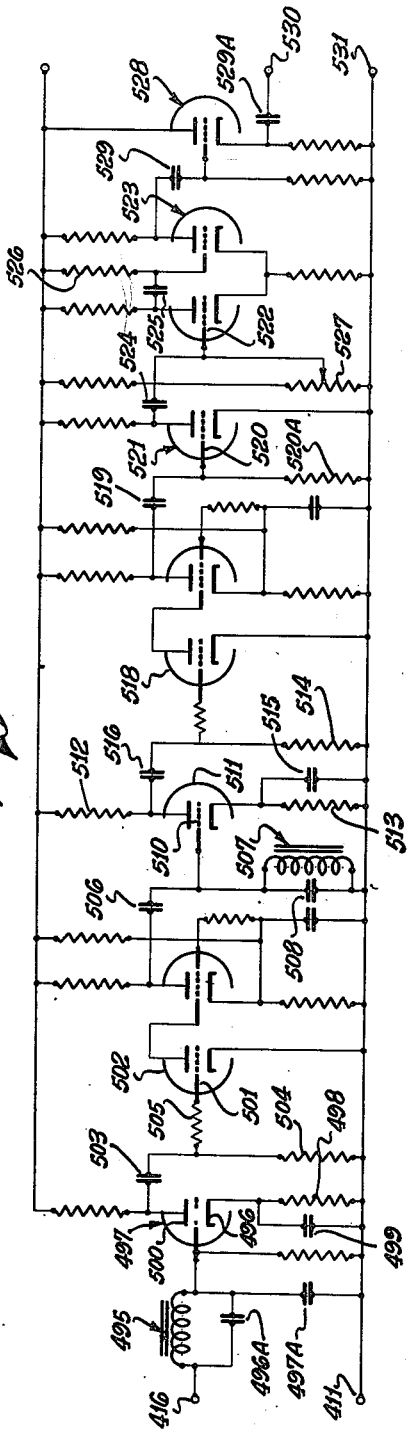

Fig. 12 is an electrical schematic circuit diagram illustrative of one embodiment of synchronizing pulse creating and keying equipment contained in the ground correlating unit which is arranged to produce synchronizing pulses in the intelligence-carrying signal from a standard reference signal, non-angular-position phase-modulated, which forms one component of the complex Hertzian wave pattern radiated from the transmitting antennae.

Fig. 13 is a block diagram illustrative of a radio receiver carried by the aircraft and cathode ray tube means for translating a video signal received from the ground radio transmitter into a visually observable reproduction of the spaced receiver locations.

Fig. 14 is an electrical schematic diagram of the translating apparatus shown in block diagrammatic form in Fig. 13 wherein cathode ray translating equipment is utilized to recreate a true perspective visual image of a landing area identified by receiver locations.

Figure 15:
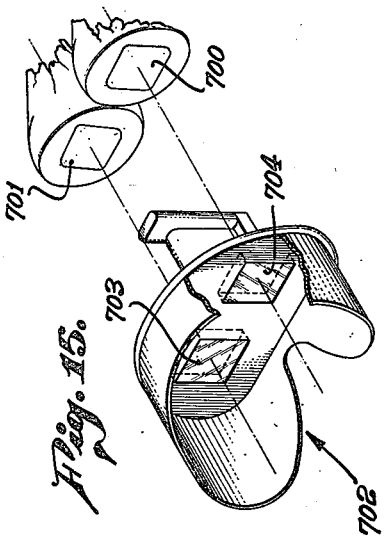

Fig. 15 illustrates in perspective an illustrative form of apparatus for viewing an image in a manner whereby ocular converging and focusing effort are minimized, thereby simulating ocular infinity viewing conditions.

Figure 16:
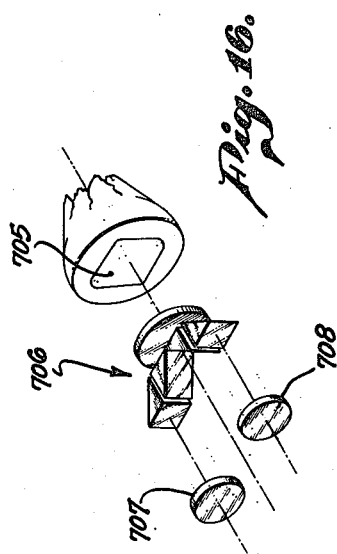

Fig. 16 illustrates a modified form of apparatus similar to Fig. 15 for viewing an image reproduced by a cathode ray tube in a manner whereby ocular converging and focusing effort are minimized, simulating ocular infinity viewing conditions.

*General description of angular position, phase-modulated, Hertzian wave component, space-scanning principles.*

The invention contemplates scanning a selected space segment with directional Hertzian waves including two separable components, each being phase-modulated at any point in the space segment. In order to understand the operation of the present invention clearly, reference will be had in the following general discussion to Figs. 1 and 2. In Fig. 1 a simple loop antenna 30 radiates a pattern 31 that is virtually of figure-eight contour. In Fig. 2, in addition to the loop 30, a second loop antenna 32 is arranged so as to be positioned about the same center as the loop antenna 30 but in a plane perpendicular thereto. It will be noted that the loop antenna 32 produces a figure-eight-shaped pattern of electromagnetic radiation indicated at 33 which is 90° physically displaced from the figure-eight pattern of electromagnetic radiation 31 produced by the first loop antenna 30. The two radiation patterns 31 and 33 are of similar size when the two loop antennae are energized with similar energy and are so shown in Fig. 2 and if excited with equal energies of the same phase of radio frequency, will produce a resultant radiated field pattern shifted 45° from either of the original patterns 31 and 33.

Now if, in accordance with the principles underlying the present invention, the radio frequency power of one loop 30 is modulated by a low-frequency sine wave and the radio frequency power in the second loop 32 is modulated by the same sine wave but displaced 90° out of phase, a received demodulated signal, received upon a plane coincident with both loop axes, has a characteristic phase dependent upon its position within such plane. In other words, a radio receiver, at point A, located upon the axis of loop 30 detects a modulated signal that has a given phase. A similar receiver, at point B, located along the axis of the second loop 32, detects a modulated wave with a phase difference of 90° as compared with the wave received by the first receiver, at point A. The phase of a detected signal, at point C, located between the axes of the two loops 30, 32, has a phase intermediate zero and 90°.

This phase shift condition in the demodulated wave is substantially independent of the phase of the radio frequency carrier wave. The relationship indicated above between the phase of the demodulated wave and the position of the corresponding receiver is substantially linear if the two loops 30, 32 radiate equal modulated radio power.

Also, in accordance with the principles of the present invention and with reference to Fig. 3 and in similar manner as described above, a second pair of loop antennae 37, 38 is mounted so that the axis 39 through the loop crossings of one pair of loops 30, 32 is at right angles to the axis through the loop crossings 40 of the second pair of loops 37, 38. The four loops 30, 32, 37, 38 are oriented so that a plane through the loop axes of the first pair of loops 30, 32 is displaced 45° from the loop axes 42, 43 of the second pair of loops 37, 38.

The second pair of loops 37, 38 is energized with modulated radio frequency in the same manner as the first pair of loops 30, 32, but with a different modulation frequency.

The above general description illustrates the principles upon which the present invention is based.

*General description of a specific system*

Generally speaking, in implementing the above principles, we provide means for generating and directing into a selected space segment a complex Hertzian wave pattern including separable components at least two of which are phase-modulated in accordance with angular coordinates of the reception point thereof with respect to the origin of complex Hertzian wave pattern or selected reference planes fixed with respect thereto. In the embodiment illustrated in Fig. 3 the means for generating the complex Hertzian wave pattern is shown diagrammatically connected to an antenna system or array arranged about a common center indicated at 47 which forms the apex of a 90° space segment and also acts as the center of coordinates of a reference system with respect to which the angular coordinates of receiver locations 65I of spaced radio receivers 45 along an airport landing strip are determined. It may be noted, however, that the invention is not limited to the specific form of antenna illustrated, and various other forms and arrangements may be used. Polarized, directional antennae, fixedly positioned with respect to two reference planes are necessary. The planes may be at 45° or 90° to each other and are preferably horizontal and vertical. The median of the space segment scanned may desirably be virtually coaxial with the longitudinal axis of the aircraft.

Fig. 3 illustrates an antenna system comprising two pairs of loop antennae, both pairs being functionally concentric. Each loop of each pair is preferably arranged so that their axes cross at 90°. One pair of loops (30, 32) is mounted with their common axes vertical and the other pair of loops (37, 38) is mounted with their common axes horizontal. All four pairs of loops are energized by the same carrier frequency. The two loops that have a common vertical axis may have the radio or carrier frequency energy reaching them modulated at the rate of 3,000 cycles per second. However, the phase of the modulation on one of these loops is displaced 90 electric degrees from the phase of the modulation being supplied the other loop. A maximum energy lobe of this pair of loops is directed forward of the aircraft by adjusting the orientation of the pair of loops. The carrier energy reaching the pair of loops having a common horizontal axis is modulated at the rate of 30 cycles per second, and the phase of the modulation of one of the loops is displaced 90 electrical degrees from that of the other loop. A maximum energy lobe is directed in the forward direction of the aircraft. This loop antenna array, supplied with energy as described above, will radiate a pattern of energy into space that has a two-frequency phase relationship in space at any one point which is different from the two-frequency phase at any other point. Therefore, we may say that the space out in front of the aircraft is scanned vertically and horizontally by the frequency and phase of the signals in the loops. Means for providing the radio frequency energy and the modulating frequency energies are provided in the aircraft and can assume various forms.

When used in facilitating blind landings, a plurality of receiving means are provided in spaced, predetermined and fixed positions with respect to a landing field. Receivers, such as 45 and 45A to 45M, may outline the boundaries of a field. In Fig. 3 a typical radio receiver 45, located within a 90° segment 46 (with apex 47 located in the center of the loop sphere and center line 48, coincident with a line perpendicular to a plane passing through the loop crossings 50, 51, 52 and 53, of both pairs of loops) detects the modulating frequency of each one of the two pairs of loops 30, 32 and 37, 38, as a mixed modulated signal. The radial angle 49, defining the receiver position 45 within this 90° radiation segment 46 in space, may then be determined by separating the two demodulated frequencies and comparing their phase angles with respect to the phase of the original modulating frequencies.

Standards of transmission

The angular-position, phase-modulated Hertzian wave components which in the example illustrated are modulating frequencies applied to the two separate pairs of loop antennae 30, 32 and 37, 38 in Fig. 3 depend upon the definition demanded in the final viewing and translating device which may be a cathode ray tube or tubes 55, 56. The similarity of the proposed viewing system with standard television picture reproducing practices warrants consideration of standards relative to picture aspect ratio, definition, picture repetition rate (frame speed), etc. The establishing of picture definition and picture repetition rate may be equivalent to setting standards of transmission as well as setting requirements for side-band frequencies. The aspect dimensions of the picture to be viewed may also be considered in determining the modulation frequency standards.

For example, and not as a limitation on the uses to which the present system may be applied, a practical set of standards may be based upon a 200 line definition, a square picture and a picture repetition rate of 30 frames a second. This indicates a horizontal scan frequency of 30×200 or 6000 cycles. In order to maintain the same definition in both dimensions of the picture the total number of picture elements per second may be 200×200×30 or $1.2 \times 10^6$ picture elements per second, i. e., the picture element time duration would be .833 microsecond. The system described herein is based upon these standards:

(a) Square picture (aspect ratio 1:1)
(b) 200 line definition
(c) 30 picture frame repetition rate
(d) .833 microsecond picture element time duration
(e) Line sweep frequency of 6000 cycles per second As previously described in the specific system, the two pairs of loop antennae 30, 32 and 37, 38 in Fig. 3 are each supplied with modulated radio frequency energy of different modulating frequencies and phases. Considering an individual pair of loops to which energy of different phase is applied to each loop, the corresponding modulating frequency determines the rate of scan or rate of change of radio energy in a 90° segment in space, i. e., the rate at which the peak power or minimum power of radiation reoccurs at a given point within the 90° radiation segment in space.

The frequency of modulation of the radio frequency supplied to the vertically polarized loops 30, 32 is modulated with 3000 cycles, which is one half the horizontal line frequency. The desirability of using half the line frequency will later become apparent. The use of 3000 cycles as a modulating frequency reduces in half the sideband frequencies of the electromagnetic spectrum that would otherwise be required. The limiting of sideband frequencies is important as it is anticipated that the original radiation from the loop antennae may be in the low-frequency radio spectrum somewhere below 600 kilocycles. Thus, the energy in the pair of loops 30, 32 may be modulated by 3000 cycles wave and the energy in the other pair of loops 37, 38 may be modulated by a 30 cycle wave.

The pair of loops 30, 32 having the modulating energy of 3000 cycles per second applied thereto are normally disposed to produce a phase pattern of the type described in a horizontal plane or in azimuth; while the other pair of loops 37, 38 having the modulating energy of 30 cycles per second applied thereto are normally disposed to produce a phase pattern of the type described in a vertical plane or in elevation.

The synchronizing signal or standard non-phase-modulated reference signal

The received and demodulated separable Hertzian wave components or phase signals at receiver 45 are a mixed signal of 30 and 3000 cycles. These two frequencies are separated by means of a frequency dividing network. Each beacon receiver 45, 45A, 45B, 45C, 45D, 45E, 45F, 45G, 45H, 45J, 45K, 45M positioned along the outline of a landing area has associated therewith a corresponding dividing network. The phase of the two frequencies (30 and 3000 cycles) separated by the dividing networks, as compared to the phase of the original modulating frequency, depends upon (1) the position of the corresponding beacon receiver within the 90° radiation segment in space, (2) the modulating frequency and distance of the receiver from the radiating source, (3) the rate of movement of the radiating source (aircraft), and (4) inherent delays or phase shift in the modulating and receiver circuits.

The inherent delays or phase shift in the modulating and receiving circuits are substantially constant and may be compensated for by means of fixed phase shift circuits.

The phase shift error introduced by the rate of movement of the aircraft is so small that, for practical purposes, it may be neglected. The amount of phase shift due to transit time of the radio wave from the radiating source (aircraft) to a beacon receiver depends upon the distance between the source and receiver and the modulating frequency. High-frequency modulated signals have more phase shift due to distance traveled than low frequencies. The 3000 cycle modulating frequency may shift in phase approximately 5.8° for every mile of distance. The 30 cycle modulating frequency, on the other hand, may shift approximately 5.8° for every 100 miles.

The error introduced in the apparent phase location of a radio beacon receiver within a 90° radiation segment in space due to the transit time delay shows that the horizontal position of the beacon receiver appears to be shifted approximately 5.8 radial degrees for every mile distance. A radio wave travels to the beacon receiver from the radiating source on the airplane; a radio wave travels from a location in the general vicinity of the beacon receiver to a receiver on the airplane; therefore the total distance of radio wave propagation is twice the actual distance from airplane to beacon receiver. An error of approximately 58° in the horizontal plane would then exist when the radiating source is five miles from the landing area. It is desirable to eliminate this error and in the system described a synchronizing means or compensation is employed to correct for horizontal phase shift error due to transit time. The vertical or 30 cycle radiated phase pattern in space shifts so little that the error is insignificant and can be disregarded.

The radial angular position of a beacon receiver relative to the radiating source (aircraft) is of paramount importance and may be determined by a person on the aircraft by comparing the phase of the modulating frequencies with the corresponding phases of the individual detected signals at the beacon receiver. This information is transmitted from the ground to the aircraft in the form of a video signal carrying intelligence as to the angular coordinates of the various ground radio receivers, where it is translated into a reproduction of the receiver locations. In other words, this comparison of phase is made at or near the individual beacon receiver, the original modulating frequencies (30 and 3000 cycles) and a non-phase scanning (or non-scanning) harmonic of these frequencies being transmitted from the original radiating source (aircraft) to the beacon receiver for comparison and correlation with the position phased signals received by the beacon receiver.

While a separate carrier frequency may be employed to transmit an original modulating frequency or synchronizing signal of 3000 cycles to the beacon receiver, a more economical way of transmitting such synchronizing signal to the beacon receivers is to reduce, on the aircraft, the original 3000 cycle modulating frequency to a sub-harmonic (1500 cycles) and mix this sub-harmonic frequency, without phase discrimination, into the same modulators to which the modulating frequencies, 30 and 3000 cycles, are applied. In other words, one or both pairs of loop antennae 30, 32 and 37, 38 have applied to them besides their characteristic modulating frequency energy of 30 and 3000 cycles, respectively, an additional modulation frequency energy of 1500 cycles, the 1500 cycle energy being applied alike to the individual loop antennae 30, 32, 37, 38 with substantially equal phase so that for all intents and purposes these antennae serve the same function as one antenna so far as the 1500 cycle component is concerned. A synchronizing or comparison signal for the 30 cycle demodulated component need not be transmitted because, as previously stated, the error introduced in transit time is negligible and the phase shift (position of beacon receiver) comparison may therefore be made at the original radiating source (aircraft) after retransmission of such 30 cycle demodulated component from the beacon receiver positions to the aircraft.

It is desirable to use the demodulated synchronizing standard reference signal of 1500 cycles as received at only one of the beacon receiver positions; otherwise, errors due to multiple time shift differences from a plurality of spaced receivers might result. An error in horizontal position of beacon receivers may therefore result if the distance between the beacon receiver positions is great. The position of the beacon receivers are usually fixed and thus a fixed amount of phase shift is desirably introduced into the several beacon receiver circuits to correct for their relative positions with relation to the particular beacon receiver which receives the 1500 cycle synchronizing comparison or standard reference signal. It is thus apparent that the amount of phase shift introduced into a beacon receiver circuit for relative comparison may also depend upon the direction and angle of approach of the original radiating source (aircraft). The landing area defined by the beacon receivers may appear to be curved, due to relative changes in transit time, if the correct angle of approach of the aircraft were not being made. The most serious instance of such curved distortion would occur when a pilot approaches a field from a direction 180° displaced from the direction for which the phase shifting means have been adjusted. It is therefore desirable that ground control personnel adjust the phase shifting means in order to correspond to whatever approach path is dictated by meteorological or other pertinent factors.

*Hertzian wave generator*

Fig. 4 shows a block diagram of a complete electronic radiating system capable of radiating a phase-scanned modulation signal of 30 cycles and also of 3000 cycles and also a second non-phased modulation 1500 cycles synchronizing signal for application to the directional antennae, as previously stated. The specific generator illustrated in Fig. 4 is arranged to generate two modulating waves of different frequencies which amplitude modulate a high-frequency carrier wave, also generated by said unit, and which themselves are phase-modulated in mutually perpendicular directions in accordance with angular coordinates of reception points within the space segment with respect to the transmitting antennae, and to also generate a third separable component of a different frequency from the other two but harmonically related to one of said frequencies and which modulates the radio frequency carrier wave and is radiated from the antenna in a non-angular-position, phase-modulated manner.

The previously described loop antenna system is schematically shown at 60 and each of the final modulated amplifiers 61, 62, 63 and 64 for the four loops 30, 32, 37, 38 is shown coupled to the loops. This coupling may be through a link circuit as described later. The output of the final amplifiers 61 and 62 is coupled to the vertically oriented loops 30 and 32, and the output of the final amplifiers 63 and 64 is connected to the horizontally oriented loops 37 and 38. All four final modulated amplifiers have applied to the input circuits thereof a voltage derived from a common radio frequency oscillator 67 through separate buffer amplifiers 68, 69, 70 and 71, respectively.

The four final modulated amplifiers 61, 62, 63 and 64 are separately modulated by the modulator amplifiers 73, 74, 75 and 76. These four modulator amplifiers are excited with a mixed signal of a combination of two of the three modulating frequencies of 30, 1500 and 3000 cycles in proper phase relationship.

These three modulating frequencies may be created electronically from a common basic audio frequency generator or oscillator 86 which generates a 3000 cycle sine wave. The output of this oscillator 86 is divided three ways. A voltage of 3000 cycles is split, in phase splitter 80 into two phase components; one in-phase component and one phase component lagging the other by 90°. These two separate voltages of different phase of 3000 cycles are then fed into the input circuits of two separate mixing circuits 82 and 83. A voltage of 1500 cycle synchronizing frequency is also fed into these two mixers 82 and 83 without phase discrimination.

A voltage of 1500 cycle frequency is created by means of a tuned multivibrator 85, that is locked to the basic 3000 cycle oscillator 86, through a buffer or isolating amplifier 87. The 1500 cycle complex wave output of the multivibrator 85 is then isolated by means of a cathode follower circuit 87 and then filtered in filter 88 to produce a harmonic free 1500 cycle sine wave. This sine wave is then fed into all four mixer circuits 82, 83, 90 and 91 in a common or equal phased relationship.

A voltage of 30 cycle sine wave is created by interlocking a 300 cycle and a 30 cycle multivibrator to the 3000 cycle oscillator 86.

The 300 cycle multivibrator 92 is coupled to the 3000 cycle oscillator 86 through a buffer or isolation amplifier 94. The output of the 300 cycle multivibrator 92 is differentiated in differentiator 95 to produce a short positive repeating pulse essential for locking the 30 cycle multivibrator 96 to the 300 cycle multivibrator 92. The complex 30 cycle output of the 30 cycle multivibrator 96 is isolated and amplified in the cathode follower's buffer stage 97 and filtered in filter 98 to produce a sine wave.

The resulting 30 cycle sine wave voltage is then split in phase splitter 100 into two voltages having phases 90° apart and fed into the two mixers 90 and 91.

The output of the mixer 82 contains a mixed signal of 3000 cycles and 1500 cycles; and the output of mixer 83 contains a signal of 3000 cycles, phase shifted 90°, and a signal of 1500 cycles. In like manner, the output of mixer 90 contains a mixed signal of 30 cycles and 1500 cycles; and the output of mixer 91 contains a signal of 30 cycles, phase shifted 90° and a signal of 1500 cycles.

The mixed output signals from the four mixing circuits 82, 83, 90 and 91 are fed into the respective modulator amplifiers 73, 74, 75 and 76. The radio frequency voltage exciting the four final modulated amplifiers 61, 62, 63 and 64 is modulated by the previously described mixed signals acting through the modulator amplifiers 73, 74, 75 and 76. The radio frequency energy from the two final modulated amplifiers 61 and 62 and the two associated vertically oriented loop antennae 30 and 32 is thus modulated by a common in-phase 1500 cycle frequency energy and also by 3000 cycle double phased frequency energy.

In similar manner, the two final modulated amplifiers 63 and 64 and associated horizontally oriented antennae 37, 38 are thus energized with radio frequency modulated energy of 1500 cycles and also by energy of 30 cycles, doubly phased.

Thus, it is noted that the 1500 cycle modulated signal is radiated from all four loop antennae 30, 32, 37 and 38 in all directions without phase discrimination relative to the direction of radiation from the loops. Also, within the 90° segment in space into which the 30 cycle and 3000 cycle modulated signals are radiated from the four loop antennae, the phases of the modulation components have different characteristic phases at corresponding different points in such space in accordance with angular coordinates thereof.

In other words, the particular point of reception within the 90° segment in space determines the corresponding phase of the detected 30 cycle signal at that point and such phase is altered when such point is considered to move in a vertical direction or in elevation. In like manner, the particular point of reception within the same 90° segment in space into which the energy is radiated determines the phase of the detected 3000 cycle signal and such phase is altered when such point is considered to move in a horizontal direction or in azimuth.

It is now apparent that the described radiated signal or complex Hertzian wave pattern from the four loop antennae 30, 32, 37 and 38 contains intelligence which may be derived by detecting the signal to establish the position of a given point in these dimensions. The detected signal also contains a non-directional detected frequency component or standard non-phased reference signal which may be used for phase comparison, correlation, and synchronizing purposes.

Figure 5:
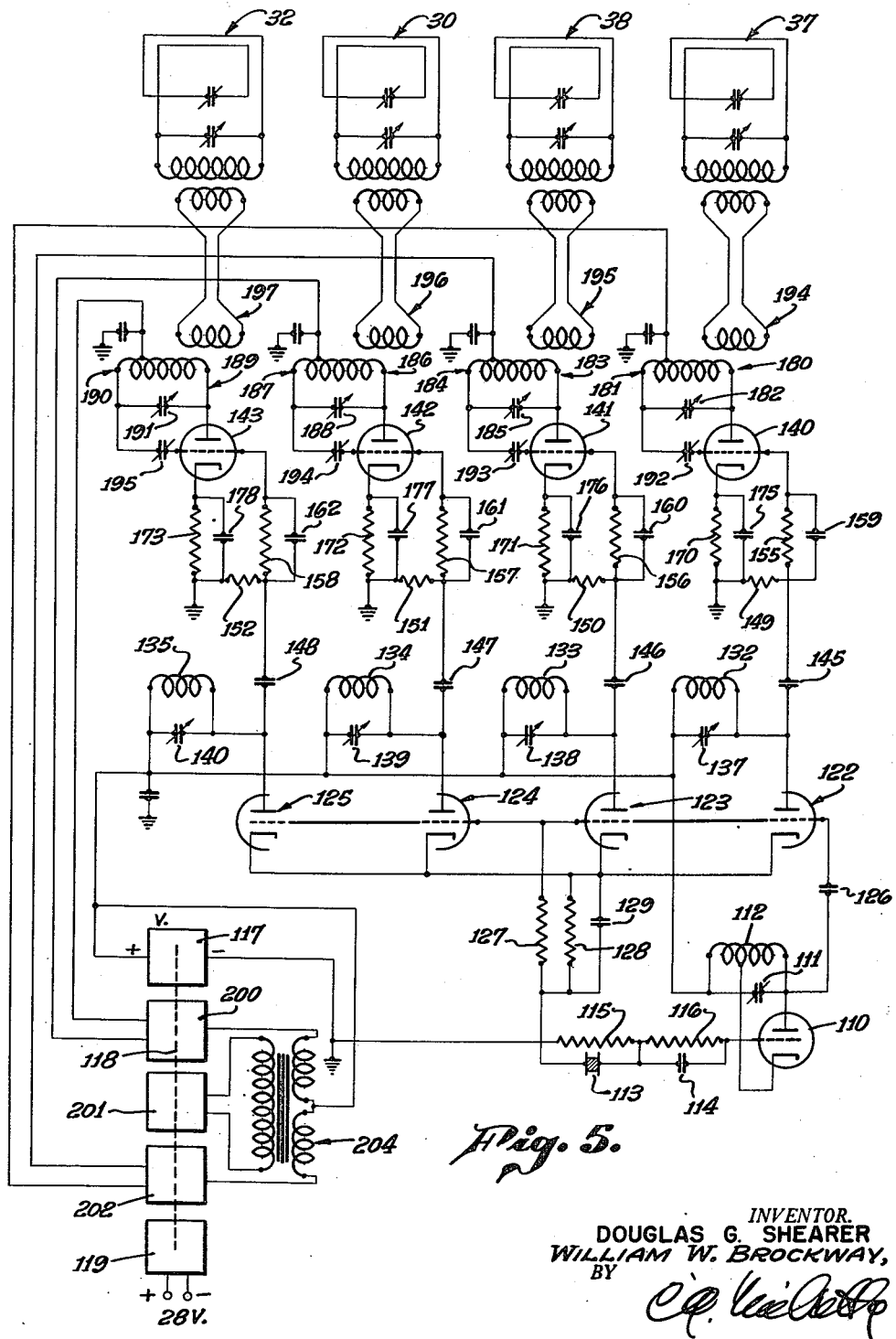
Fig. 5 illustrates a schematic electrical circuit diagram of a different form of means for generating the separable components which are to be radiated from the antennae so as to produce two-dimensional, phase-modulation in accordance with angular coordinates of reception thereof.
Figure 6:
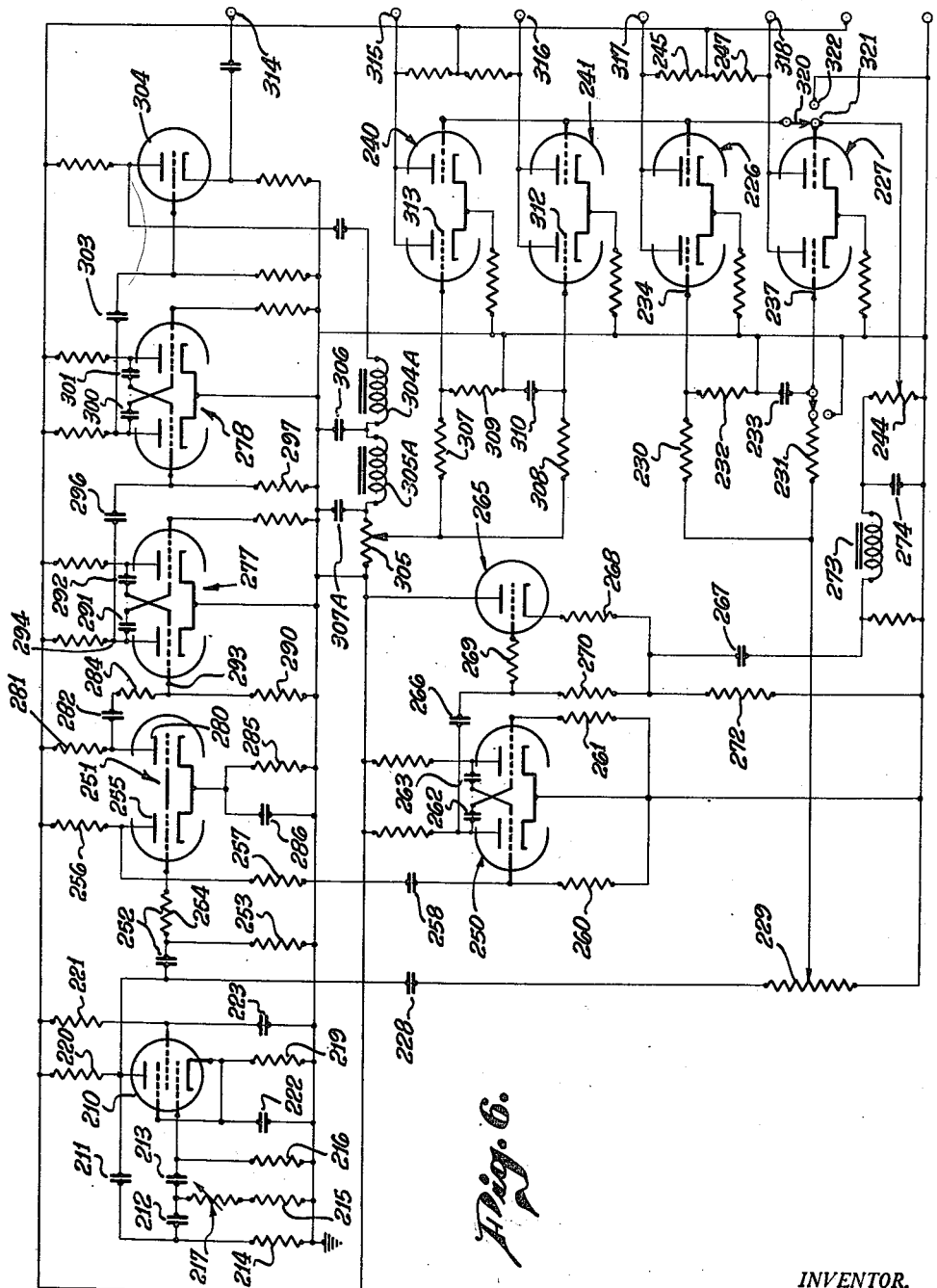
Fig. 6 illustrates in electrical schematic form an exemplary all-electronic system for producing the separable components which are to form part of the angular position, phase-modulated, complex Hertzian wave to be radiated from the transmitting antennae and is a specific form of the general system shown in Fig. 4.

The radiation pattern in space described above may be obtained by the apparatus shown generally in Fig. 4, and more specifically in Fig. 6, or by the apparatus shown in Fig. 5 employing a rotary converter arranged to supply the modulating plate voltages of proper phase and frequency to the final modulated amplifiers 61, 62, 63 and 64 in Fig. 4.

One exemplary circuit arranged to produce the required modulating frequencies and phases is shown in Fig. 6. The output from the circuit of Fig. 6 may be applied as indicated in Fig. 4 to the input of four modulators and final amplifiers of conventional design and coupled to the loop antenna system previously described to produce the desired radiated phase scan pattern.

In Fig. 6 a basic 3000 cycle generator 210 is of a phase shift feedback type wherein the frequency of the oscillations is controlled by the capacity resistance network defined by capacities 211, 212, 213 and resistances 214, 215, 216 and by the variable resistance 217 which serves as an adjustable frequency control. In one step, by multivibrator means, the output of generator 210 is converted to a 1500 cycle signal while in two successive steps, a part of the 3000 cycle output is converted to 300 cycle and then 30 cycle output.

Other resistors 219, 220 and 221 and capacities 222 and 223 provide the necessary elements to complete the oscillator circuit. The sine wave output of this oscillator is divided three ways. A portion of the 3000 cycle output voltage is fed to two sections of the mixer amplifier 226 and 227, through the coupling condenser 228, attenuating potentiometer 229 and phase splitting network comprising resistors 230, 231 and 237, and capacity 233. The phase of the voltage applied to the grid 234 of the dual mixing tube 226 is in phase with the oscillator output; and the grid 237 of the dual mixing tube 227 is fed with a voltage which lags the oscillator output voltage by 90° due to the delay introduced by the condenser 233.

The main control grids of all four of the dual mixing tubes 240, 241, 226 and 227 are each supplied with 1500 cycle energy through the gain control potentiometer 244. A mixed signal of 3000 cycles and 1500 cycles then appears across the plate resistor 245 of the parallel connected plates of the mixer tube 226. In like manner, a mixed signal of 1500 cycles and 3000 cycles with a 90° phase lag appears across the plate resistor 247 of the parallel connected plates of the dual mixer tube 227.

The 1500 cycle sine wave voltage which is applied to the four main control grids of the dual mixer tubes 226, 227, 240 and 241 is obtained by filtering the output voltage of a 1500 cycle multivibrator 250 which is synchronized with the 3000 cycle oscillator 210. One section of a dual type of tube 251 serves as a buffer amplifier between the 3000 cycle oscillator 210 and the 1500 cycle multivibrator 250. The capacity 252 and grid resistance 253 and 254 serve as a coupling means for such buffer amplifier and oscillator 210.

The output voltage appearing on the plate 255 of the buffer amplifier appears across the anode resistance 256 and is fed to the grid circuit of the 1500 cycle multivibrator through the series resistance 257 and coupling condenser 258. The grid resistance 260 and 261 and coupling condensers 262 and 263 have such values that the frequency of oscillation of the multivibrator is slightly less than 1500 cycles. The synchronizing signal as received from the oscillator 210 then serves to lock the frequency of vibration of the multivibrator 250 to the desired harmonic of 1500 cycles.

The output of the multivibrator 250 is then isolated from the circuit components that follow by means of a cathode coupled amplifier 265. The capacity 266 and capacity 267 serve as coupling condensers for the cathode follower 265. Normal class A bias voltage for the cathode coupled amplifier is obtained by the use of the voltage dropping resistance 268 and the grid resistances 269 and 270. Voltage variations appearing across the cathode resistance 272 are essentially the same as those which would otherwise appear in the output circuit previously described. This output voltage appearing across resistance 272 is converted into substantially a sine wave by means of the single section filter network comprising the series inductance 273 and shunt capacity 274. The resulting 1500 cycle sine wave is then applied to the control grids of the mixer tubes 226, 227, 240 and 241 as previously described.

A 30 cycle sine wave is obtained by interlocking two multivibrators 277 and 278 to the 3000 cycle oscillator 210. The second or other section of the buffer amplifier tube 251 serves to isolate the 300 cycle multivibrator 277 from the 3000 cycle oscillator 210. It is noted that the two control grids of tube 251 are connected together.

The output voltage of the second section of the tube 251 is transferred from the plate 280 and plate resistance 281 to the grid of the 300 cycle multivibrator 277 through the coupling condenser 282 and series attenuator resistance 284. The common cathode resistance 285 and bypass condenser 286 are connected to provide the proper class A bias voltage for both sections of the buffer amplifier tube 251.

The values of the grid resistances 284 and 290 are of such magnitudes that the 300 cycle multivibrator 277 is balanced to oscillate at 1500 cycles or a slightly lower frequency. The coupling condensers 291 and 292 serve also to balance the multivibrator 277. The 3000 cycle voltage applied to the grid 293 of the multivibrator 277 produces synchronous operation of the multivibrator with the oscillator 210. Thus, the output voltage appearing on the plate 294 is essentially of a symmetrical square wave character.

The coupling condenser 296 is of relatively low magnitude, as is the serially connected grid resistance 297, so that these two components, namely condenser 296 and resistance 297, serve as elements of a differentiating network to provide voltages across resistance 297 having alternate positive and negative pulses in each cycle thereof. A sharp positive pulse produced by this network is desirable for synchronizing action of the 30 cycle multivibrator 278 with the 300 cycle multivibrator 277.

Grid resistances 297 and coupling condensers 300 and 301 allow the multivibrator 278 to oscillate at a frequency of 30 cycles or less, thereby allowing it to be locked in synchronism with the multivibrator 277 and oscillator 210.

The essentially square output wave of the 30 cycle multivibrator 278 is amplified in the amplifying circuit described as follows: The coupling condenser 303 couples the 30 cycle output voltage to the control grid of the amplifier tube 304. The amplified output appearing on the plate of tube 304 is in turn coupled to a double section filter network to shape the multivibrator output wave into a sine wave.

For this purpose, the two series inductances 304A and 305A and two shunt condensers 306 and 307A provide sufficient filter action to produce a relatively good sine wave for the purpose at hand.

The magnitude of the 30 cycle voltage applied to the mixer tubes 240 and 241 is controlled by the potentiometer 305. The parallel connected phase splitting network comprising the resistances 307, 308 and 309 and condenser 310 serves to couple the resulting 30 cycle voltage to the input circuit of the mixer tubes 240 and 241 so that the phase of such 30 cycle voltage applied to the grid 312 of the dual mixing tube 241 lags the 30 cycle voltage applied to the control grid 313 of tube 240 by 90°. The synchronizing voltage of 1500 cycles is applied to the other parallel connected grids of the mixing tubes 240, 241, 226 and 227 in the manner described previously.

The plates in the two sections of these mixer tubes 240, 241 are interconnected and connected on the one hand to terminal 315 and on the other hand to terminal 316 so that a mixed 30 cycle and 1500 cycle signal appears at terminal 315 and a mixed 30 cycle and 1500 cycle signal appears at terminal 316, but with the 30 cycle signal at terminal 316 shifted 90° in phase with respect to the 30 cycle signal appearing at terminal 315.

As indicated previously, in similar manner, the 3000 cycle signal appearing at terminal 317 is shifted 90° with respect to the 3000 cycle signal appearing at terminal 318. Thus, the output from the four dual mixing tubes 226, 227, 240 and 241 appearing respectively at terminals 317, 318, 315 and 316 supply the necessary combination of frequency and phases to the modulator stages of four radio transmitter systems. These radio transmitter systems are coupled to the loop antennae 30, 32, 37 and 38 as described previously to radiate the proper signal in space to produce the desired intelligence or phase.

In Fig. 6, it is noted that switch 320 is shown connected to terminal 321 so as to interconnect all of the right-hand grids in tubes 226, 227, 240 and 241 so that the circuit functions as previously described. It is sometimes desirable, for test purposes, to isolate the three frequencies produced by this unit. Thus, when switch element 320 engages the contact 322, in the second position of the switch, the 1500 cycle voltage is applied only to the right-hand grid of the mixer amplifier 227 and the corresponding grids of the other mixer tubes 226, 240 and 241 are each grounded; simultaneously, the 3000 cycle voltage normally applied to the left-hand grid of the mixer amplifier tube 227 is removed, in which case a single voltage of 1500 cycles may be obtained from terminal 318 and a 3000 cycle voltage may be obtained from terminal 317.

In Fig. 6, as explained previously, the terminals 315, 316, 317 and 318 are each connected to a modulator stage of a radio transmitter. This connection is indicated in Fig. 4 by reference numerals 315, 316, 317 and 318.

*Alternate generating means*

Fig. 5 shows a circuit of a radio transmitter that employs a mechanical electrical generator power supply means to provide modulating waves of proper frequency and phase.

The basic radiating frequency is supplied by a radio frequency oscillator comprising the vacuum tube 110, plate resonant circuit 111, 112, the crystal 113, grid circuit component of capacity 114, and resistors 115 and 116. Plate voltage is supplied from a generator 117 which is a part of the special generator or converter system. The generator 117 is driven through the common shaft 118 by the motor 119, which may be supplied from a 28-volt battery supply, as indicated.

The radio frequency oscillator tube 110 is coupled to the four grids of buffer amplifier tubes 122, 123, 124 and 125 through a common coupling condenser 126 and grid resistor 127. A common cathode bias system is shown, and consists of the cathode resistor 128 bypassed by condenser 129.

Parallel resonant plate coupling means consisting of inductances 132, 133, 134 and 135, and corresponding individual variable tuning capacities 137, 138, 139 and 140 are shown for a corresponding one of the individual buffer amplifier tubes 122, 123, 124 and 125, respectively. The plate voltage for these buffer amplifier tubes is obtained from the direct current generator 117.

The output voltages of the buffer amplifiers 122, 123, 124, 125 are coupled, respectively, to the grids of the class C plate modulated amplifiers 140, 141, 142 and 143 through coupling capacities 145, 146, 147 and 148 and grid resistors 149, 150, 151 and 152. These class C amplifiers are biased by means of corresponding grid leak combinations of resistances 155, 156, 157 and 158 and capacities 159, 160, 161 and 162, and corresponding cathode biasing arrangements of resistors 170, 171, 172 and 173 and bypass capacities 175, 176, 177 and 178. The plate tank circuits of these final class C amplifiers 140, 141, 142 and 143 consist of the corresponding parallel resonant combinations of inductances and capacities 180, 181, 182, 183, 184, 185, 186, 187, 188 and 189, 190, 191. The four capacities, 192, 193, 194 and 195, are used for neutralization in the final amplifiers. The output circuits of the final class C amplifiers are link coupled to the loop antenna system 30, 32, 37 and 38 through link coupling coils 194, 195, 196 and 197.

Alternating current power is supplied to the plates of all four final class C amplifiers 140, 141, 142 and 143 by means of a specially designed alternator and transformer arrangement. Three separate alternators 200, 201 and 202 are driven by the motor 119. Two-phase 3,000 cycle voltage is obtained from one alternator 200 and fed to the two final class C amplifiers 142 and 143 which are associated with the horizontally oriented loop antennae 30 and 32, respectively. The two separate phases are fed to the separate class C amplifiers 142, 143. The modulating frequency and phase of the modulated radiated energy is, therefore, controlled in the horizontal dimension by this alternator 200.

A 30-cycle, two-phase alternator 202 is in like manner connected to the plate circuits of the two class C amplifiers 140 and 141 which are associated with the vertically oriented loop antennae 37 and 38. The modulation frequency and phase of the modulation components in the radiated energy in the vertical dimension is, therefore, controlled by this alternator 202.

Common to all four plate circuits of the class C amplifiers 140, 141, 142 and 143 is added a voltage of 1,500 cycle synchronizing frequency and also a direct current component from the generator 117. The 1,500-cycle alternator 201 is coupled to the common direct current return of the two-phase alternators 200 and 202 by means of a transformer 204. The 1,500-cycle voltage induced in the center tapped secondary winding of transformer 204 is transferred in equal amounts and in corresponding equal phase in the output circuit of the final class C amplifiers 140, 141, 142 and 143, which in turn are coupled to the antennae 30, 32, 37 and 38. These loop antennae 30, 32, 37 and 38 are preferably tuned to the mean carrier frequency and are link coupled as indicated in Fig. 5.

Thus, the radiated energy from the loop antenna system produces a phase scanning pattern of the same type as described above.

*Receiving means*

The "blind" landing system described herein presents a visual picture of a landing field or other area as seen from the radiating source (aircraft). A number of spaced receivers 45 are employed along the outline of the landing area or at other predetermined points, the waves received by such receivers being automatically correlated to establish the position of the aircraft in space for transmission of a video signal to the aircraft.

Each beacon receiver receives the modulated wave transmitted from the aircraft and detects or demodulates the received carrier wave. The demodulated components comprise, a complex wave of mixed frequencies which in the specific embodiment herein described is composed of a 1500 cycle synchronizing signal, a 3000 cycle phased signal and a 30 cycle phased signal. This detected mixed signal from each one of the beacon receivers is sent by individual conductors 330 (Fig. 3) to a central control station or correlating means 331 near the landing area where a comparison is in effect made of the phases of the 3000 and 30 cycle components and correlation thereof takes place. To attain this, the 3000 cycle and 30 cycle components of the detected signals are separated from the complex demodulated waves of each receiver, and the 1500 cycle synchronizing signal is picked off from one of the receivers. Standard dividing network practice is employed to separate the detected frequencies.

The diagram of Fig. 7 illustrates a series of beacon receivers 45, 45A, 45B, 45C, etc., and individual transmission lines 330 leading to the central station illustrated by the dotted boundary line 331. For illustrative purposes and for simplicity only two of the transmission lines 333 are shown connected to their respective line amplifiers 335 and 336. These line amplifiers are of conventional design and capable of amplifying all three frequencies, namely, 30 cycles, 1500 cycles and 3000 cycles. The outputs of these amplifiers 335 and 336, as well as the output of the other line amplifiers are connected to individual dividing networks 340, 341, 342, 343. The output voltages of these individual amplifiers are also connected to individual stationary contacts of a selector switch 345, whereby the detected signals from any one of the beacon receivers 45, 45A, 45B, etc., may be selected and connected to a synchronizing signal dividing network 346.

The beacon receivers 45, 45A, 45B, etc., may be of conventional design, either of the tuned radio frequency type or of the superheterodyne type and may operate to receive the carrier frequency of, for example, 600 kilocycles transmitted from the aircraft. These beacon receivers need not necessarily be very sensitive inasmuch as the range of operation is ordinarily five to ten miles.

Phase comparison principles

The phase of two sine waves of equal or harmonically related frequencies may be compared by observing electronically corresponding points on different waves and then measuring the displacement between such points. For example, Fig. 8 shows two sine waves 348, 349 of the same frequency, but wave 349 lags wave 348 by 90°, i. e., the peak of wave 348 is reached 90° ahead of the peak of wave 349. Thus, a phase comparison may be made by comparing the displacement either between peaks or between nodes of the different waves 348, 349. Preferably, the nodes (zero points) of the waves are used as reference points since they are more easily determined electronically. The node point of a sine wave may be determined by amplifying the wave sufficiently and then clipping off the peaks of the waves, thereby producing a square wave with very steep sides, and then differentiating the resulting square wave to produce positive and negative pulse markers 350, 351, 352, 353, as indicated in Fig. 9. The spacing between any two marker pulses 350 and 351 or 352 and 353 serves as a measurement of the phase displacement of the two waves. This method of phase comparison is, in effect, used in the present arrangement.

Synchronizing pulses

As previously explained, a synchronizing standard reference signal of 1500 cycles is desired because of phase shift introduced by transit time, i. e., the time required for a wave to travel between the aircraft and the landing area in relationship to the frequency or period of the modulating components. In general, the phase of the 3000 cycle modulating component signal is compared with the 1500 cycle standard reference signal at the central control station 331 by multiplying the two frequencies in different amounts to obtain a common comparison frequency of 6000 cycles, producing .8 microsecond pulses at the nodes of the differentiated sine waves 350, 351 and comparing the pulse positions.

In Fig. 7 the complex detected signal comprising components of 30 cycles, 3000 cycles and 1500 cycles from one of the illustrated line amplifiers 335, 336 is applied through the selector switch 345 to the input circuit of the network 346 wherein the 1500 cycle component is selected and the other components eliminated by means of the separating or dividing network 346. The output voltage of network 346 is amplified in amplifier 343 to produce a 1500 cycle sine wave illustrated at $r$. This amplified voltage is further amplified and clipped in clipper 349 to produce a square wave illustrated at $s$. This resulting square wave is differentiated in differentiator 350 to produce equally spaced, alternate polarity pulses illustrated at $t$. These pulses shock excite a high "Q" 6000 cycle resonant circuit 351 to produce in its output circuit a 6000 cycle sine wave illustrated at $u$ having very little amplitude variation when the resonant circuit has a high "Q." This 6000 cycle signal is interlocked, of course, with the original 1500 cycle standard reference or synchronizing signal. The 6000 cycle signal is further amplified in amplifier 352 to produce the wave illustrated at $v$. This amplified wave is amplified and clipped in clipper 353 to produce the square wave, illustrated at $w$. The square output wave from the clipper 353 is differentiated in differentiator 354 to form alternate positive and negative pulses spaced at intervals of $\frac{1}{12000}$ of a second, as illustrated at $x$. The negative pulses of this differentiated wave are then selected, inverted and amplified by means of a zero-biased amplifier 355 to produce the wave, illustrated at $y$.

It is noted that the output of this amplifier 355 contains a series of positive pulses spaced at intervals of $\frac{1}{6000}$ of a second. This resulting series of positive pulses is shaped into .8 microsecond rectangular pulses by triggering a "one-shot" multivibrator 356. The resulting .8 microsecond rectangular pulses, illustrated at $z$ (which are referred to herein as synchronizing pulses) are applied to a low impedance transmitter keying circuit represented by the terminal 357 through a cathode coupled circuit 358. The amplitude of the pulse at terminal 357 is adjusted to such a value whereby it keys an ultra-high-frequency transmitter for 100% power output, as is described later.

Thus, a series of synchronizing standard reference pulses .8 microsecond wide occuring at regular intervals at a rate of 6000 per second are interlocked to the 1500 cycle standard reference frequency. At this point it should be recalled that the 1500 cycle signal is radiated without spatial or directional phase discrimination. Therefore the phase of the original 1500 cycle synchronizing signal is not dependent upon the position of the beacon receiver in space which receives such signal except for differences in transit times from the radiating antenna array to the several receivers. Such differences, or transit time increments, are constant for any given glide path of an approaching airplane, and are compensated for during calibration of the system by adjustment of phase shifters 362, 363, 380 and 381 for each circuit. Thus, this resulting series of 6000 reoccuring .8 microsecond pulses per second, illustrated at $z$, provides a fixed time base with respect to which other time shifts or phase shifts may be compared.

Beacon receiver position indicating pulses

Referring again to Fig. 8, it is noted that for every complete cycle of the sine wave shown therein the wave goes through a node twice, i. e., two marker pulses, one positive and one negative, as indicated in Fig. 9, may be created for each cycle. Both of these marker pulses may be used in the phase comparison and correlation system described later, providing the phase shifts to be compared are not greater than 180°. In the system described herein a 90° segment in space is phase scanned so that in this instance the phase of the 3000 cycle and 30 cycle modulating signals may be observed twice for each corresponding wave thereof. Thus, 6000 marker points per second may be obtained from the 3000 cycle horizontal phase-scanning frequency.

The reason for employing a phase-scanning frequency that is equal to one-half the horizontal scan frequency for a 200-line picture of the type described above is now apparent. In order to have all of the marker points resulting from nodes of the sine wave in a positive direction, the 3000 cycle scan frequency appearing at the output of the line amplifiers 335, 336 is doubled in corresponding frequency doublers 360, 361 after passing through corresponding dividing or separating networks 341, 343 and phase shifter circuits 362, 363. The output of the doubler circuits 360, 361 is amplified in amplifiers 364, 365, then clipped in clippers 366, 367 and differentiated in differentiators 368, 369. The positive pulses of the wave appearing at the output of the differentiators 368, 369 are eliminated by the zero biased amplifiers 370, 371 wherein, at the same time, the negative pulses are amplified and inverted by the action of this amplifier.

The output of these amplifiers 370, 371 is applied to the .8 microsecond gate multivibrators 372, 373. It should be noted that the phase shifters 362, 363 may be adjustable to provide for correcting for the phase shift introduced by circuit conditions and to cause alteration of the pattern ultimately received and viewed on the aircraft.

Thus a 3000 cycle sine wave appearing at the output of, for example, the line amplifier 345 undergoes a series of transformations, as illustrated at $a$, $b$, $c$, $d$, $e$, $f$, $g$ and, as will be described in detail later, causes a series of pulses $h$ to be formed in the multivibrator 372. In other words, a 30 cycle sine wave is illustrated at $a$ corresponding to the condition of the wave appearing at the output of the network 341. The wave is shifted in phase, as illustrated at $b$, its frequency then doubled, as illustrated at $c$. The wave is amplified, as illustrated at $d$, and subsequently clipped, as illustrated at $e$. The wave is then differentiated, as illustrated at $f$, the positive pulses are selected, as illustrated in $g$, and this resulting wave $g$ is utilized to cause the production of pulses $h$ in the multivibrator 372.

The positive pulse $g$ at the output of the amplifiers 370, 371 triggers a "one-shot" multivibrator 372, 373 to produce .8 microsecond pulses of rectangular shape, as illustrated at $h$. These pulses $h$ occur 6,000 times a second, provided the corresponding multivibrator 372, 373 is not biased to an inoperative condition by a biasing signal received from the output of the corresponding cathode follower 376, 377 whose purpose is described in more detail later.

Suffice it to say for the present that the received 30 cycle per second signal is used to control the operativeness of the corresponding multivibrator 372, 373. These pulses, illustrated at $h$, of course, are synchronized with the received 3000 cycle per second signal so that in the event that the phase of the 3000 cycle per second signal shifts, the series of pulses, illustrated at $h$, likewise shifts. Since the phase of a particular received 3000 cycle signal is dependent upon the position of the associated beacon receiver in space, it is apparent that the position of the series of pulses, illustrated at $h$, likewise is dependent on the position of the associated beacon receiver in space.

These pulses are thus shifted along the time axis relative to the synchronizing pulses, illustrated at $z$ within a $\frac{1}{12,000}$ second interval (which corresponds to a phase shift of 90°) depending upon the location of the associated beacon receiver in azimuth. A 90° phase shift of a 3000 cycle signal represents a time shift of $\frac{1}{12,000}$ of a second in pulse position along the time axis. This shift in pulse position along the time axis when compared with the fixed phase position of the 1500 cycle synchronizing signal transformed into the wave, illustrated at $z$ carries intelligence, whereby the position of the associated beacon receiver in azimuth may be determined. In other words, the relative positions of the waves illustrated at $z$ and $h$ serve as an indication of the position of the associated beacon receiver in space.

*Means for producing receiver position intelligence-carrying signal (correlating means including electronic gating means)*

The multivibrators 372, 373 are each controlled in accordance with the received 30 cycle signals. In Fig. 7 the 30 cycle signal appearing at the output of the corresponding line amplifier 335, 336 is applied to the filter networks 340, 342 which serve to segregate the 30 cycle signal from the 1500 cycle signal and also from the 3000 cycle signal and also from the 3000 cycle signal.

The output voltage of the networks 340, 342 is essentially a sine wave, as is illustrated at $i$. This sine wave voltage may have its phase shifted in the corresponding phase shifter 380, 381 which may be manually adjustable to provide compensation for phase changes in the network or for purposes of establishing a predetermined pattern on the cathode ray tube in the aircraft to which intelligence is transmitted as it described later.

The output voltage of the phase shifters 380, 381 is applied to the clippers 382, 383 in which the wave is amplified and clipped to produce a square type of wave illustrated at $k$. A second clipper 384, 385 may be interposed after the first corresponding clipper 382, 383 to produce a more rectangular type of wave as illustrated at $l$. The resulting square wave is applied to corresponding differentiators 386, 387 to produce the wave illustrated at $m$.

The pulse illustrated at $m$ serves to trigger a "one-shot" gate multivibrator 388, 389 to produce a 167 microsecond rectangular pulse every thirtieth of a second, as illustrated at $n$. This may be termed a gating pulse. This 167 microsecond rectangular pulse is isolated from the corresponding gate multivibrator 388, 389 by means of the cathode coupled amplifier or cathode follower 376, 377. This 167 microsecond rectangular pulse from the cathode followers 376, 377 provides the necessary positive bias to the .8 microsecond multivibrators 372, 373 to condition it for operation by positive pulses of the type illustrated at $g$ from the amplifiers 370, 371.

In other words, the multivibrators 372, 373 are operative only during the time one of the pulses represented at $n$ is applied thereto and when one of the positive pulses illustrated at $g$ occurs simultaneously. Thus, in order to produce a pulse of the type illustrated at $h$ it is necessary that a pulse of the type illustrated at $n$ and a pulse of the type illustrated at $g$ exist concurrently to effect operation of the multivibrators 372, 373.

The biasing 167 microsecond pulse from the cathode followers 376, 377 allows the corresponding .8 microsecond multivibrator 372, 373 to select only one pulse every thirtieth of a second. The particular 167 microsecond pulse which is selected during any one thirtieth second interval depends upon the particular phase of the 30 cycle wave illustrated at $j$, with which the pulses illustrated at $n$ are in synchronism.

It is apparent that the time during this 167 microsecond interval in which an .8 microsecond pulse occurs depends upon the phase of the 3000 cycle sine wave illustrated at $b$. In other words, a series of pulses occur in which each pulse having a duration of .8 microsecond is spaced one thirtieth of a second from the succeeding or preceding pulse. The spacing between each such series of these recurring pulses depends upon the position of the beacon receivers within the 90° segment into which the original radio frequency carrier is radiated. The position of the controlled pulses (represented by 405, 407) within the period of gating corresponds to an angular coordinate of the receiver.

The selected pulses, as delivered from all of the .8 microsecond multivibrators 372, 373, etc. associated with their respective beacon receivers are coupled through cathode follower circuits 390, 391 to a common low impedance, ultrahigh-frequency keying circuit 392.

A series of .8 microsecond pulses spaced at intervals of $\frac{1}{30}$ of a second appears for each beacon receiver. Each of these groups of pulses are spaced relative to each other, depending upon the relative position of the associated beacon receivers in space. The keying circuit 392 is adjusted to key the ultrahigh-frequency transmitter to 75% of its power output. This adjustment is desirable in order to distinguish the 100% power synchronizing pulses appearing at terminal 357. In other words, the positioning pulses in circuit 392 are distinguished from the synchronizing pulses at terminal 357 by amplitude difference.

Because of this difference in amplitude the pulses may be easily separated by well-known amplitude separation methods. It is understood that other forms of separating techniques may be used, but for simplicity, this amplitude method, described in detail later, is preferred.

Figs. 10A through 10E serve to illustrate the manner in which the positions of the pulses resulting from the 30 and 3000 cycle waves are altered as the phase of the original waves is shifted, the comparison being made with reference to the pulses derived from the 1500 cycle synchronizing frequency. In Fig. 10A a 3000 cycle sine wave is illustrated with the positive rising node of the sine wave starting at zero time. The one-tenth part of the 30 cycle sine wave with the positive rising node of the wave starting at zero time is shown in Fig. 10B. The 1500 cycle synchronizing sine wave is illustrated in Fig. 10C with the positive rising node again starting at zero time interval. The 3000 cycle sine wave illustrated in Fig. 10D represents the same wave as shown in Fig. 10A, but in Fig. 10D the wave is shifted in phase by 90° or one-quarter of a cycle corresponding to a time .00008. It is noted that the time scale in each one of the Figs. 10A through 10E is identical.

In Figs. 10A and 10D the 75% power keying pulses which may be created at the nodes of the 3000 cycle wave are also shown as vertical lines. The equally spaced pulses that are produced by the 1500 cycle synchronizing signal are also shown in light vertical lines in Fig. 10C.

In Fig. 10B the 167 microsecond gating pulses (created in the multivibrators 388, 389 in Fig. 7) at the start of the positive rising nodes of the 30 cycle sine waves for two differently phased waves are also illustrated. The one wave 400 is shown to lag the other wave 401 by 1.9°.

In comparing Figs. 10A through 10E it is noted that the 167 microsecond gating pulse 403 at zero degrees phase shift causes the multivibrator gate 372 in Fig. 7 to open to allow only one position pulse 405 in Fig. 10A to pass through to the keying circuit 392. This pulse 405 is again illustrated in Fig. 10C and Fig. 10E, it being noted that Fig. 10E shows the synchronizing and position pulses for the phase conditions now described. It is also noted that if the 3000 cycle wave in Fig. 10D is shifted 90° from the zero time axis that a pulse 407 occurs simultaneously with the gating pulse 403 in Fig. 10B. The concurrence of these two pulses in time causes the gate of the multivibrator 372 to open to allow an .8 microsecond pulse 407 to enter the keying circuit 392. This second pulse 407 lags the first pulse 405 by $\frac{1}{12,000}$ of a second which corresponds to 90° of a 3000 cycle wave. This combination of pulses 405, 407 repeats every 30th of a second or after every 200th synchronizing pulse.

The significance of the relative positions of these position pulses 405, 407 with respect to the synchronizing pulse 406 is attributed to the difference in position of the two associated radio beacon receivers in azimuth located at the two edges of the previously described 90° segment in space into which the carrier frequency is radiated from the aircraft. Since the 167 microsecond gating pulse 403 in Fig. 10B is located on the zero time (zero base) position of the 30 cycle sine wave, it may be concluded that the two radio beacon receivers from which the pulses 405, 407 are derived are located on the top edge of the 90° segment in space when the scanning direction is from left to right and top to bottom. The two positioning pulses 408, 409 that are concurrent with the 167 microsecond pulse from multivibrator 388 in Fig. 7 may be considered to be produced by two radio beacon receivers located on the edges of the 90° segment in space, but displaced down from the top edge of the 90° segment in space by 1.9 radial degrees.

It is thus apparent that every radial beacon position within the 90° segment in space may be represented by a pulse position lagging a synchronizing pulse by a time interval between zero and $\frac{1}{12,000}$ of a second. Also, each position pulse repeats after $\frac{1}{30}$ of a second or after 200 synchronizing pulses.

It is also observed that the $\frac{1}{12,000}$ second space interval ahead of each synchronizing pulse is not utilized for position pulse information. This intervening space may be used for other purposes. For example, another .8 microsecond pulse may be added or inserted into the ultra-high-frequency transmission system on the ground, and the position of this added pulse may be shifted relative to the synchronizing pulse by means of well-known pulse shift modulation methods to produce a voice communication means. Thus, one-way voice communication may then be established over the same ultra-high-frequency transmission channel which is locked to the 6,000 pulse per second synchronizing signal.

Pulse generating, gating and correlating means

Electronic circuits arranged to produce the desired pulse sequence from the detected frequencies of 30 cycles, 1500 cycles and 3000 cycles are shown in detail in Figs. 11 and 12. These figures show one form of pulse creating and keying equipment utilized in correlating the Hertzian wave components received by a receiver and adapted to produce pulses of relatively low frequency and long duration positioned in accordance with angular phase modulation of one of the separable Hertzian wave components received by a given receiver, and adapted to produce relatively high-frequency, short duration pulses positioned in accordance with phase modulation of the other separable Hertzian wave components received by a given radio receiver and including electronic gating means for selecting certain of the high-frequency pulses under the control of the low-frequency gating pulses for producing a signal carrying intelligence corresponding to the angular coordinates of a given radio receiver. Fig. 11 shows the 30 cycle and 3000 cycle channels of Fig. 7 in greater detail.

The complex detected signal comprising 30 cycle, 1500 cycle and 3000 cycle components from the output circuit of the amplifier 335 in Fig. 7 is applied to terminals 410 and 411 in Fig. 11. The series inductance 412 and shunt capacity 413 serve as a filter arranged to pass the 30 cycle component of the detected complex wave and to attenuate the higher frequencies. The series capacity 414 and shunt inductance 415 serve as a filter arranged to attenuate the 30 cycle component of the detected complex wave and to pass the 1500 cycle and 3000 cycle components so that these two frequency components appear across the terminals 411 and 416. Terminals 411 and 416 of Fig. 11 correspond to the same numbered terminals of the synchronizing pulse circuit illustrated in Fig. 12.

In Fig. 11 the 1500 and 3000 cycle signal is fed through the parallel resonant circuit comprising inductance 420 and capacity 421, which circuit is tuned to 1500 cycles, thereby offering maximum series impedance to that frequency. The shunt inductance 422 offers further attenuation to the 1500 cycle component. Thus, substantially, only the 3000 cycle component appears on the control grid of tube 424 which serves as a phase-shifting circuit corresponding to the phase shifter 362 in Fig. 7. The plate resistor 425 and cathode resistor 426 of tube 424 are of equal value. The 3000 cycle signal appearing between the cathode of tube 424 and lead 428, which may be grounded, is in phase with the voltage applied to the control grid of tube 424 while the signal appearing at the plate terminal is substantially 180° out of phase with the signal applied to the grid. The capacity 426 and variable resistance 427 serve as a means for shifting the phase of the 3000 cycle signal applied to the capacity 430 and to the primary winding of transformer 432. With the variable resistance 427 adjusted to zero resistance, the resulting in phase signal across resistance 426 is coupled directly to the following circuits. When the resistance 427 is adjusted to its maximum value, which may be infinity, the resulting 180° out-of-phase signal is applied to the same following circuits. It is thus apparent that the variable resistance 427 may be adjusted to an intermediate value so as to provide any degree of phase shift between zero and 180°. The required phase shift to compensate for circuit delays may be introduced at this place, if desired.

The duplex diode pentode vacuum tube 435 is used as a frequency doubler and amplifier and corresponds to the corresponding units 360, 364 in Fig. 7. The signal from the center tapped secondary of the transformer 432 is full wave rectified through action of the two diodes 436, 437 of tube 435. The full wave rectified voltage appears across the resistor 438 and is applied directly to the grid 439 of the pentode section of the tube. The amplified full wave is rectified through action of the two diodes 436, 437 of the tube 435. The full wave rectified voltage appears across the resistor 438 and is applied directly to the grid 439 of the pentode section of the tube. The amplified full wave rectified signal is coupled through the condenser 440 to a 6000 cycle tuned resonant primary winding of the transformer 441. The capacity 442 resonates such primary winding. The 6000 cycle sine wave is further amplified by the amplifier circuit comprising the triode vacuum tube 445, cathode resistor 446, plate resistor 447, coupling condenser 449, and grid resistor 450. The amplified 6000 cycle sine wave is clipped by action of the direct current amplifier's circuit which includes a dual section high gain vacuum tube 451 with almost zero bias upon the grids of the tubes. The peaks of the 6000 cycle sine wave are symmetrically clipped in the grid circuits 452 and 453 of tube 451.

The clipped sine wave output of the clipper tube 451 (corresponding to the clipper 366 shown in Fig. 7) is essentially a square wave, as illustrated at e in Fig. 7. This square wave signal is coupled to the grid 455 of a positive pulse amplifier 456. The coupling circuit includes a small condense 457 and resistor 458 with a circuit time constant of .1 microsecond. The differentiated pulses obtained from this coupling circuit are applied to the grid 455 of the zero-biased amplifier 456. The negative pulses are transformed and cause the production of amplified positive pulses at the plate of the tube 456. These positive pulses are coupled to the grid 461 of the "one-shot" multivibrator circuit 459.

This "one-shot" multivibrator circuit including tube 459 corresponds to the multivibrator 372 shown in Fig. 7 and is normally in an inoperative condition wth the flow of current to the plate 460 biasing the grid 461 to a negative or "off" condition due to the voltage drop in the common cathode resistor 462. The multivibrator is tuned by means of the coupling capacity 463 and grid resistor 464 to produce .8 microsecond pulses. The positive pulses delivered to the grid 461 of the "one-shot" multivibrator is normally not sufficient in amplitude to overcome the normal bias voltage on the grid 461, an additional positive voltage being necessary to trigger the multivibrator circuit.

This additional positive voltage for triggering the circuit is supplied to the grid 461 through resistor 465 from the voltage divider 466. The "one-shot" multivibrator circuit including tube 459 is therefore inoperative unless the proper bias voltage is supplied to the tube 459 at the same time and concurrently with any one of the 6000 per second reoccurring positive pulses which are applied to the grid 461 of the tube. The voltage across the variable resistor 466 thus serves as a gating voltage for the multivibrator circuit including tube 459. The .8 microsecond pulse produced by the "one-shot" multivibrator is coupled by means of the coupling capacity 466 and grid resistance 467 to a cathode follower amplifier 468 corresponding to the cathode follower 390 in Fig. 7. The low impedance characteristics of the cathode coupled amplifier are ideal for pulse coupling circuits using low impedance transmission lines. The output from the cathode follower amplifier 468 is coupled through capacity 469 to the ultrahigh-frequency transmitter keying circuit 392.

This .8 microsecond pulse is the "positioning pulse" and functions to modulate an ultrahigh-frequency transmitter to 75% power as compared to the 100% power keying produced by the synchronizing pulses.

The gate bias voltage produced across the variable resistor 469 is dependent upon the 30 cycle vertical scanning frequency applied to the grid 470 of the phase shifting circuit using the tube 471. The resistors 472, 473 and 474 and condensers 475 and 476 have the same function as similar units in the 3000 cycle phase shifter circuit 424 which is described above. The peaks of the 30 cycle sine wave are clipped twice by action of the two cascade direct coupled amplifiers employing the dual high gain triode vacuum tubes 478 and 479. These clipper amplifiers operate in the same manner as the previously described amplifier 451. It is desired to employ two instead of one clipper amplifier in order to produce a steep-sided square wave to produce, in turn, short trigger pulses of 20 microsecond duration or less.

The condenser 480 and resistor 481 have small electrical values in order to produce differentiating pulses of less than 20 microseconds upon the grid 482 of the 167 microsecond gate "one-shot" multivibrator 483 which corresponds to the multivibrator 388 in Fig. 7.

The grid 482 is normally biased to an inoperative condition by the voltage drop across the common cathode resistor 484 produced by the space current flowing to the plate 485. The grid 482 is supplied with an added positive voltage from the voltage divider 486, through the grid resistor 481. The negative grid voltage applied to the grid 482 is adjusted by means of the voltage divided 486 to a condition wherein a small positive pulse across the resistor 481 triggers the "one-shot" gate multivibrator circuit including tube 483 to produce a rectangular pulse of the type illustrated at $n$ in Fig. 7. The duration of this rectangular pulse is determined by the time constant of the circuit comprising the coupling capacity 488, resistor 489 and variable resistor 490. This time constant is adjusted to be approximately 167 microseconds in duration. One such pulse will thus occur every $\frac{1}{30}$ of a second. Each of the pulse-producing means includes clipper means for clipping the separable components, differentiating means for producing sharply peaked pulses at the nodes of the clipped waves, and multivibrator means for producing virtually flat-topped pulses of the proper frequency and period.

The gate multivibrator including tube 483 is isolated from the .8 microsecond multivibrator 459 and vice versa by means of the cathode follower amplifier circuit including tube 491. Thus, the 167 microsecond pulse is coupled to the variable gate voltage divider 466 by means of the coupling capacity 492.

It is thus apparent that the 167 microsecond pulse occurring every $\frac{1}{30}$ of a second biases the .8 microsecond multivibrator including tube 459 to a condition for such a period of time that a concurrent one of the 6000 per second reoccurring pulses produced by the 300 cycle horizontal scanning frequency causes such multivibrator circuit tube to be triggered. The particular one of the 200 reoccurring pulses (6000 divided by 30) which will cause the multivibrator to be tripped depends upon the phase of the 30 cycle signal applied to the terminals 410, 411 in Fig. 11. Also, the particular time during the 167 microsecond interval at which the multivibrator circuit including tube 459 is tripped depends upon the phase of the 3000 cycle signal applied to the same terminals 410, 411.

The position of the gating pulses corresponds to one of the angular coordinates of the receivers and the position of the controlled pulses within the periods of gating pulses corresponds to the other angular coordinate of the receivers.

A synchronizing pulse of the type illustrated at $z$ in Fig. 7 may be created by a circuit of the type shown in Fig. 12. The 1500 cycle and 300 cycle signals applied to the terminals 416, 417 are separated by action of the parallel resonant circuit comprising inductance 495, condenser 496A and the shunt capacity 497A. This parallel resonant circuit is tuned to 3000 cycles and therefore is of maximum impedance at that frequency. Thus, substantially, only the 1500 cycle synchronizing voltage appears on the grid 496 of the amplifier tube 497. The cathode resistor 498 and bypass condenser 499 provide the proper class A bias for the triode amplifier tube 497.

The output from the plate 500 of this amplifier tube is coupled to the grid 501 of a direct current amplifier and clipper tube 502 by means of the coupling capacity 503 and grid resistors 504, 505. The clipper circuit including clipper tube 502 corresponds to the clipper 349 in Fig. 7. The function of the clipper tube 502 is to symmetrically clip the peaks of the sine wave appearing on its grid to produce a square wave of the type illustrated at $s$ in Fig. 7. This square wave output coupled through a small capacity 506 produces differentiated pulses of alternating positive and negative polarity across the parallel resonant circuit comprising inductance 507 and capacity 508. The pulse shock excites the parallel resonant circuit 507, 508 to produce a 6000 cycle sine wave signal at the grid 510 of the amplifier tube 511. This resonant circuit is tuned to 6000 cycles and has a high "Q."

The 6000 cycle sine wave thus produced is amplified by the amplifier circuit including the triode amplifier tube 511, resistors 512, 513 and 514 and capacities 515 and 516. This amplified sine wave is subsequently clipped by the clipper circuit including tube 518, and is differentiated by the small condenser 519 and small resistor 520A to produce .8 microsecond pulses of the type shown at $x$ in Fig. 7, at the grid 520 of the positive pulse amplifier tube 521.

The amplified positive pulses are coupled to grid 522 of a "one-shot" .8 microsecond multivibrator including tube 523 by the coupling condenser 524. The action of this "one-shot" multivibrator including tube 523 is identical with the corresponding one described in connection with the circuit shown in Fig. 11. The .8 microsecond pulse created by this multivibrator tube 523 is controlled by the time constant of the coupling condenser 525 and resistor 526. The bias voltage on the grid 522 is controlled by adjustment of the voltage divider 527. The .8 microsecond pulse created by this "one-shot" multivibrator tube 523 is, of course, synchronized with the original 1500 cycle synchronizing signal and reoccurs at the rate of 6000 times per second. The 6000 .8 microsecond pulses per second are coupled to the cathode follower amplifier 528 by the coupling condenser 529. The low impedance output of the cathode follower 528 is coupled to an ultrahigh-frequency transmitter keying circuit through coupling capacity 529A and line terminals 530 and 531. These synchronizing pulses appearing at terminals 530, 531 key the ultrahigh-frequency transmitter to 100% power output.

Means for transmitting the intelligence-carrying signal to the aircraft

Standard or well-known transmitter pulse keying systems may be used to produce an ultrahigh-frequency carrier signal modulated by the pulses from the output terminals of the circuit shown in Figs. 11 and 12 (corresponding to the output circuits designated as 357 and 392 in Fig. 7), thus producing a video signal. Since the expedient of modulating a high frequency transmitter with pulses for transmission is well known, a precise circuit arrangement for the same need not be described in detail.

The circuit 392 in Fig. 7 corresponds to the circuit connected to the terminals 392, 428 in Fig. 11 and the circuit designated as 357 in Fig. 7 corresponds to the circuit connected to the terminals 530, 531 in Fig. 12.

Thus, a pulse-modulated transmitter of the type mentioned is effective to transmit the intelligence ascertained on the ground back to the aircraft, the transmitted video signal modulated with pulses being received on the aircraft receiver system shown in block form in Fig. 13 and in more detailed form in Fig. 14.

Means carried by aircraft for translating received video signal into visual image (cathode ray tube)

The positioning and synchronizing pulses compared and correlated on the ground are transmitted to the original radiating source (aircraft) by standard pulse transmission methods and received by standard receiving means, shown in Figs. 13 and 14, connected to translating means, which will now be described.

In Fig. 13 the ultrahigh-frequency pulse receiver 540 is shown coupled to the pulse separator circuit 541. The 100% power synchronizing pulses which, it will be remembered, comprise the pulsed signal corresponding to and produced from the standard reference signal originally transmitted from the aircraft in non-angular positioned phased manner, as well as the 75% power position pulses, which comprise the pulse position modulated signal corresponding to and carrying intelligence as to the phase-modulated signals received by each of the radio receivers adjacent the landing strip and the angular coordinates of said receivers, are applied to the pulse separator and are represented at 542. The synchronizing pulses separated by the separator 541 and applied to the synchronous pulse multivibrator 543 are represented at 544. These pulses 544 are applied to the one-shot multivibrator or blocking oscillator circuit 543, which functions to trigger the following six thousand cycle horizontal sweep generator 545. The pulses applied to this generator 545 are illustrated at 546. The output wave of the generator 545 is illustrated at 547. This saw tooth type of wave illustrated at 547 is applied alike to the input circuits of the horizontal amplifiers 548 and 549, whose output is coupled respectively to the cathode ray tubes 550, 551. Specifically, the output of these amplifiers 548, 549 are connected to the horizontal deflecting plates of the corresponding cathode ray tubes 550, 551.

The associated vertical deflecting plates of these two cathode ray tubes 550, 551 are supplied with 30 cycle sweep signals which are originally applied to terminal 553. Specifically, a differentiated 30 cycle signal illustrated at 554 obtained from the original 30 cycle synchronizing source illustrated in Fig. 4 is applied to the 30 cycle synchronous pulse multivibrator 555 at whose output terminals a rectangular type of wave illustrated at 557 is applied to the input circuit of the vertical sweep generator or oscillator 558 to trigger the sweep oscillator circuit 558 in such a manner as to produce a saw tooth wave of the type illustrated at 560 at the output terminals of the generator 558. This saw tooth wave 560 is applied to the input terminals of the two vertical sweep amplifiers 561, 562, whose output terminals are connected respectively to the vertical deflection plates of the cathode ray tubes 550, 551, respectively.

Thus, the deflecting plates of the cathode ray tubes 550, 551 are supplied with sweep voltages from different sources which are synchronized. It is apparent that by proper adjustment of the cathode ray beam, centering controls, and amplifier gain, the two cathode ray tubes may produce identical images.

The position pulses (75% power pulses) illustrated at 564 at the output terminals of the pulse separator 541 are applied to the input circuit of the position pulse amplifier 565 wherein the pulses are amplified and applied to the tubes 550, 551 in like amounts to control the intensity of the cathode ray beams in such tubes to thereby control the brightness of the luminescent spot where the cathode ray beam impinges the screen.

The cathode ray beams of both cathode ray tubes are normally biased "off" to a condition that allows the 75% positive power position pulses to turn the cathode beam "on" and thus produce an instantaneous bright spot upon the screen. The brightness of the spot, of course, depends upon the amplitude of the position pulses. The amplitude of these position pulses may be controlled on the ground to aid in creating the illusion of depth. The direction of approach of the aircraft with respect to the landing area whose outline is defined by the fixed beacon receivers may be considered to be a predetermined direction of flight and any deviation from such predetermined direction of flight, by proper adjustment of the control equipment on the ground, may be observed on the aircraft as spots which are brighter than normal upon the face of the cathode ray tube screen. In other words, the desired direction of approach of an aircraft with respect to the landing area may be predetermined, in which case it is possible to regulate the position pulse amplitudes in such a manner that the approach beacon positions appear as brighter spots upon the face of the cathode ray tube screen when the actual flight path of the aircraft deviates from the desired direction of approach.

Fig. 14 shows in more detail some of the apparatus illustrated in block diagram in Fig. 13. In Fig. 14 the 30 cycle differentiated synchronizing pulses are supplied to terminals 570, 571. These pulses appear on the grid 572 of the dual vacuum tube 573, which operates as a one-shot multivibrator with the time width of the pulses adjusted to 0.0167 second by adjustment of the grid resistor 574 and coupling condenser 575. The plate 576 of tube 573 is normally supplied with space current to produce a negative bias upon grid 572 due to the voltage drop across the cathode resistor 581. The variable resistor 578A is adjusted to supply positive bias to the grid 572 to balance out a portion of the negative bias. The sensitivity of the one-shot multivibrator including tube 573 is adjusted by this bias balance control. Each synchronizing pulse of the type illustrated at 554 in Fig. 13 applied to the grid 572 triggers the multivibrator to produce positive pulses of the type illustrated at 557 in Fig. 13 at the plate 576.

These positive pulses at plate 576 are utilized to minimize or reduce to zero the normal negative bias applied to the grid 577 of the sweep generator tube 578. Negative bias for tube 578 is obtained from voltage divider 579 and supplied to the grid 577 through grid resistor 580. This sweep generator tube 578 is normally biased to "cut-off." The condenser 582, when the tube 578 is non-conducting, is gradually charged through the plate resistor 583. A positive pulse applied to the grid 577 causes the bias voltage on tube 578 to be minimized or reduced to zero to cause the previously charged condenser 582 to discharge rapidly through the tube 578. A saw tooth output signal of the type illustrated at 560 in Fig. 13 thus appears at the plate 584 of the sweep generator tube 578.

This saw tooth wave at plate 584 is coupled through the condenser 585 to two variable resistors 586 and 587 which are adjustable to control individually the amplitude of the signal applied to the grids 590, 591 of the two 30 cycle sweep amplifier tubes 592, 593, respectively. A portion of the amplified output signal appearing on the corresponding plates 594, 595 is coupled to the grids 596, 597 of the second section of these corresponding tubes. The phase and magnitude of such signals applied on the one hand from anode 594 to grid 596 and on the other hand from anode 595 to grid 597 may be adjusted by adjustment of the corresponding resistors 600, 602 and resistors 601, 603, respectively. A push-pull type of sweep signal may thereby be produced across the two anodes 594, 595 of the tubes 592, 593. This push-pull amplified 30 cycle sweep signal appearing across the anodes 594, 595 is applied by means of the coupling condensers 604, 605, 606 and 607 to the corresponding vertical deflecting plates 608 and 609, respectively, of the cathode ray tubes 610, 611.

The position, in the vertical direction, of the cathode ray beam of these cathode ray tubes may be controlled by the dual voltage control variable resistors 612 and 613. Positive potential on one of the vertical plates of the cathode ray tube is increased as the negative potential applied to the other cooperating plate is decreased or vice versa when these dual control resistors 612, 613 are varied. A shifting of the cathode beam in the vertical direction may thereby be accomplished. The resistors 615A, 616A, 617A, 618, couple the positioning voltages to the respective plates of the cathode ray tubes 610, 611.

In Fig. 14 the circuit immediately below the 30 cycle sweep circuit previously described, is arranged to supply 6,000 cycle sweep signals to the horizontal deflecting plates of the cathode ray tube and is identical in function and operation to the 30 cycle sweep circuit with the exception that the time constant of certain circuit elements is different in the 30 and 6,000 cycle sweep circuits. The 6,000 cycle sweep circuit including tube 615 is adjusted to produce rectangular pulses of .001 second duration of the type illustrated at 546 in Fig. 13 by adjustment of the time constant of the circuit including resistor 616 and condenser 617. The sweep voltage produced at the plate 620 of the sweep amplifier 621 thus recurs every .002 second and sweeps for .001 second. This sweep voltage is applied to the variable resistors 622, 623, to control the horizontal sweep width on the cathode ray tubes 610, 611. The horizontal amplifiers including tubes 598, 599 are identical to the corresponding vertical amplifier circuits including tubes 592 and 593 and need not be further explained.

Also, the horizontal beam-centering controls 618, 619 have the identical function as the vertical beam-centering controls 612, 613 and need no further explanation.

The positioning pulses from a standard pulse amplifier represented at 565 in Fig. 13 are applied between terminals 571 and 628. These positioning pulses are applied to the intensity control grids 630, 631, respectively, of tubes 610, 611 through the coupling condenser 632, and the corresponding series current-limiting resistor 633, 634. Negative bias voltage for the grids 630, 631 is obtained from the voltage divider 636. This negative bias voltage is applied to the grids through the grid resistor 636A.

A high voltage power supply of approximately 1800 volts, preferably of the radio frequency type, provides all the necessary voltages for the cathode ray tubes. The positive terminal of the 1800-volt source is connected to the grounded directors 636B, 637B, while the negative terminal of such 1800-volt source is connected to terminal 640. The voltage divider comprising resistors 641, 642 and 635, 636, 637 are connected between ground and terminal 640. The cathodes 638 and 639 of the cathode ray tubes are connected together and to point 640A on the voltage divider circuit to render these cathodes positive with respect to the intensity control grids 630, 631. The potentials on the focusing electrodes 642A, 643 are individually controlled by the corresponding variable voltage dividers 636 and 637.

It is possible to individually control the cathode ray tube within the operational limits of this "blind" landing system by adjustment of the controls heretofore described. The beams of the cathode ray tubes 610, 611 are adjusted to produce identical images upon the face of the two tubes.

The image produced electronically upon the face of either one of the cathode ray tubes 610, 611 (corresponding to the cathode ray tubes 55, 56) appears, as illustrated, in enlarged form upon the screen 650 in Fig. 3.

In other words, the screen 650 represents in enlarged form the electronic image produced on one of the cathode ray screens. The various spots 651 thereon represent the corresponding positions of the beacon receivers 45, 45A—45M outlining an aircraft landing area when such landing area is phase scanned in accordance with the present invention from a point 47. The full screen 650 thus represents a 90° scan in a vertical and horizontal dimension. In a practical application of the system a 60° scan may be sufficient. It is observed from a study of the cathode ray control circuits in Fig. 14 that the field of view including the spots 651 (shown in Fig. 3) may be shifted by adjustment of the centering controls 612, 613, 614, 619.

The area of the pattern on the cathode ray screen 650 may be expanded or diminished in either the horizontal or vertical dimension by adjustment of the gain controls 586, 587, 622 and 623. In normal practice, the antennae system 30, 32, 37 and 38 (best shown in Fig. 3) is oriented so as to produce a phase scan pattern in a 90° segment directly in front of the aircraft. The field of view may be shifted within this 90° scan area by electronic methods.

It should be noted that the above descriptions of the apparatus shown in block diagrammatic form in Fig. 13 and more specifically in electrical schematic form in Fig. 14, which is adapted to receive from the ultrahigh-frequency transmitter located at airport the signal carrying intelligence as to the angular coordinates of the various beacon receiver positions around the airport with respect to the transmitting antennae carried by the aircraft and to translate same into a visually observable reproduction of the receiver locations, indicate two cathode ray tubes indicated in block diagrammatic form in Fig. 13 as 550 and 551 and indicated in electrical, schematic form in Fig. 14 as 610 and 611. Two cathode ray viewing tubes are used as illustrated in Figs. 13 and 14 so that the viewing faces thereof, indicated in Fig. 15 as 700 and 701, may cooperate with means for binocularly viewing the images in a manner minimizing ocular converging and focusing effort whereby infinity ocular viewing conditions are simulated.

One such means is shown in Fig. 15 and indicated generally at 702. The apparatus illustrated in Fig. 15 comprises two viewing lenses spaced apart the customary interocular distance and indicated at 703 and 704. In the example illustrated, the lenses 703 and 704 are plus lenses. Thus the lenses tend to decrease the focusing effort of the eye which normally takes place when viewing near objects and the separation of the cathode ray tube screens 700 and 701 makes unnecessary the converging effort normal to the eyes when focusing upon a near object. In other words, while viewing the two spaced, coplanar cathode ray screens 700 and 701, which are relatively close to the observer, his eyes do not converge in the manner which normally would occur when focusing upon a plane as close as the cathode ray screens.

In addition, the plus lenses produce the same optical effect as ocular, near-by focusing effort, thereby relieving the eye of the necessity of such close focusing effort. Preferably the lenses have such a plus rating as to reduce the ocular focusing effort virtually to zero. In the preferred arrangement, the focusing and converging effect is such as to virtually simulate normal ocular infinity viewing conditions whereby no normal, ocular, near-by viewing muscular accommodation effort is required on the part of the pilot.

A modified form of the apparatus shown in Fig. 15 is disclosed in Fig. 16 diagrammatically. In this case, only one cathode ray tube 705 is utilized. However, a beam or image splitter of a type well known in the art, indicated generally at 706, is positioned in front of the image carried on the screen 705 of the cathode ray tube and splits same into two identical images which may then be viewed through two eye pieces 707 and 708, each of which may be a suitably plus lens for minimizing ocular focusing effort, preferably to such an extent as to virtually simulate infinity viewing conditions. The beam splitter is arranged to produce two identical images which are separated by a distance virtually equal to the normal ocular interpupillary distance, thus relaxing or avoiding the ocular convergence customarily required when viewing near objects.

It should be noted at this point that the novel viewing means illustrated in Figs. 15 and 16 are more specifically described, illustrated and claimed in copending patent application of Douglas G. Shearer, Serial No. 150,682, filed March 20, 1950, and more complete details regarding said invention will be found in said copending application. Suffice it to say that the general idea upon which said invention is based is that "motion stereopsis" is adequate for conveying to the brain of a visual observer of a medium or longer distance scene, a sense of depth perception and relative distance and spatial relationship of various components of the scene viewed. This is not the same thing as the usually understood stereoptic effect by which is meant the difference in the view seen by each eye when observing a scene. In other words, under such normal binocular stereoptic viewing, each eye sees a slightly different view of a given scene than the other eye and components of the same have different parallactic displacements in the two different eye views in accordance with distance from the two eyes. This type of binocular stereoptic vision is effective at relatively short distances only, since at medium or longer distances the base line of the triangle formed by the line of sight to each eye from a distant object and the interpupillary distance between the pupils of the eyes, which merely is said interpupillary distance, is too small relative to the distance to the distant object to produce any noticeable parallactic effect. Therefore, such binocular stereopsis is ineffective under medium or long distance viewing conditions such as would be encountered when landing an aircraft on a landing strip, for example.

However, even under very distant viewing conditions, if relative motion between the observer and the entire scene viewed (or individual components of the scene viewed) takes place, a sort of a sequential stereopsis occurs. In other words, separate and distinct views of the scene separated by a time interval which may be very minute, will show different components of the scene in different relative positions in a manner quite similar to the difference between the views seen by each of the eyes in ordinary near-view, binocular stereopsis. The parallactic or relative displacement of relative components of the scene which lie at different distances from the observer during such relative movement or before and after given time periods during which relative movement has taken place, enables the observer to form a mental concept of depth, relative distance and spatial relationship of various components of the scene viewed, even though he is at a very considerable distance therefrom.

This is the type of motion stereopsis which normally takes place during the landing of an aircraft under visual contact conditions with the landing strip and allows the pilot to make a very accurate and safe landing. Since the present invention is primarily directed to a system and method for providing the pilot of an aircraft approaching a landing strip under reduced visibility and ceiling conditions, with a visual true perspective view of selected points identifying the landing strip, it is quite desirable that this motion stereopsis effect just described be preserved in its entirety so that the pilot may take full advantage of the depth perception, distance and spatial relationship perception of the selected points around the landing strip which he perceives from the image reproduced by cathode ray tube means in the aircraft.

Unfortunately, this motion stereopsis effect is seriously impaired by the normal method of viewing a relatively small image on the end of a cathode ray tube. The reason for this is because when the eyes focus on the screen of a cathode ray tube placed fairly near to the pilot's eyes and having a relatively small image thereon, the pilot's eyes both converge upon the image and focus correspondingly for the short distance between the pilot's eyes and the image. The mere fact that such muscular focusing and converging effort has taken place interferes with the transmission to the pilot's brain of the desired mental concept. True enough, the eyes see an image in proper perspective of various illuminated points corresponding to the positions of the radio beacons around the landing strip, but at the same time, the focusing and converging effort conveys to the brain of the pilot the message that he is focusing on a near image and is not viewing a distant image, such as the airport would be under actual visual contact landing conditions from the attitude and altitude of the aircraft approaching the landing strip. Thus much of the effectiveness of the present system is lost under such viewing conditions.

Through the use of the apparatus shown in Figs. 15 and 16 and more fully described in the aforementioned copending application Serial No. 150,682, the eyes are relaxed as to focusing and as to converging and are in a condition precisely like their normal condition when viewing a scene at infinity focus, which merely means beyond a certain distance from the eyes beyond which the eyes do not change focus or convergence substantially for viewing at different distances. Thus, the impression resulting from the lack of ocular muscular focusing and converging effort while viewing a reproduction in true perspective of the relative positions of the radio beacons around the landing strip below, conveys to the brain precisely the same concept as that which would be received if the eyes of the pilot, from the position of the aircraft, viewed the airport and light beacons positioned at the locations of the radio beacons, and the pilot can take full advantage of the hereinabove described motion stereopsis effect for achieving an accurate landing under hazardous visibility conditions.

It should also be noted that if the optimum degree of natural effect is to be achieved, a similitude of viewing angles must be preserved. In other words, various points of the image as viewed by the pilot must subtend equal pupillary angles to those which would be subtended by the same points on the airport at the pilot's pupils in the position and attitude of the approaching aircraft. If this similitude of viewing angles is not preserved, some degree of distortion occurs. This is also more fully described, claimed and illustrated in the aforesaid application of Douglas G. Shearer, Serial No. 150,682. It should be noted that suitable masking means of the type more specifically described, illustrated and claimed in the aforesaid copending application of Douglas G. Shearer, Serial No. 150,682 may be employed in conjunction with the viewing means of the present invention in order to produce a mental concept in the mind of the observer the same as that experienced when viewing a relatively distant scene through a relatively near aperture, such as an aircraft windshield frame or the like. This has considerable utility in that the relative orientation of the distant scene viewed with respect to the binocularly viewed near aircraft windshield frame conveys information to the mind of the pilot as to the attitude and position of the aircraft with respect to the distant scene which may be an airport landing strip. Full details of the operation of this system may be found in the above-referred to copending application.

Time sharing

It is noted that only approximately one half of the available transmission time is utilized. In other words, only a time corresponding to 180° is used. Additional pulse signals may be introduced into the ground transmitter during the unused time to actuate, for example, an automatic switching circuit in the aircraft to provide a method of time sharing the transmission from a limited number of aircraft. This may be accomplished in a number of ways. The shape or repetition rate of these additional time switching pulses may make the transmitters and receivers of a selected number of aircraft operative in a predetermined sequence. Each aircraft would then view the landing area from its particular position in its approach to the landing area. The degree of definition provided in such a time sharing system may be controlled to provide a picture with maximum definition for the aircraft making the immediate landing while other approaching aircraft are simultaneously provided with a less definite but adequate picture.

Another form of "blind" landing system described in this application may be had by placing the phase-scanning transmitter and antennae at the beacon position. When a number of beacon transmitters are thus used, within a given area, one transmitter may serve a number of transmitter systems located at the beacon positions. In this type of system there is time sharing of the beacons within a given area. The beacon antennae systems are connected in sequence to the transmitters. Each beacon antennae system is switched on for one picture frame or 200 lines. When large numbers of beacon positions are used, the frame rate and sweep rate in the cathode ray tube is higher to produce a picture with a minimum of flicker. In such instances, a cathode ray tube having a screen of longer persistency may be used. Frame synchronization is locked in with the antennae sweeping sequence, and the antennae sweeping operation occurs at zero modulation. Horizontal sweep synchronization may be obtained in the same manner as previously described herein. The aircraft in such case each have a receiver to receive the scanning radio frequency from the beacon radiators as well as a frequency dividing network, phase combining and analyzing equipment, axis trigger circuit and cathode ray switching and viewing equipment. This equipment is described hereinabove and only in this modified arrangement the location of the component parts has been changed.

It is apparent that in this modified system wherein the transmitters are located on the ground essentially the same elements are present as in the system described in detail. However, one basic change is required in the direction of sweep in the cathode ray. If the phase rotation pattern transmitted from the ground is top to bottom and sweeps in a clockwise direction, the cathode ray sweep is from bottom to top and right to left upon the screen. This is opposite to the sweep direction in the system described above in greater detail.

In the system described in detail, in the drawings the picture produced electronically is a direct view of the landing area pattern, whereas in the second form described immediately above, the picture is reflected picture of the landing area and therefore requires a reversal to obtain a correct picture.

It is apparent that this modified landing system, wherein the phase-scanning antennae are located on the ground, has an advantage in that it provides a pattern of the landing area to an unlimited number of aircraft at one time. It also has the advantage of simplification of equipment requirements on the ground and on the aircraft. It has the great disadvantage of not giving the aircraft pilot a complete picture from the viewpoint of the aircraft. Aircraft attitude cannot be determined, only the landing strip position can be observed with disregard to attitude of the aircraft.

Numerous modifications and variations of the present invention within the spirit and scope hereof will occur to those skilled in the art and are intended to be included and comprehended herein. It should be noted that the present invention is not limited to the specific type of pulse-generating equipment described and illustrated herein which forms a part of the correlating station or unit where angular position phased signals from the various receivers are effectively compared or correlated with a standard, non-phased signal. Various types of position intelligence-carrying signals and apparatus and methods for producing same may be employed other than the specific pulsing equipment hereinbefore described and illustrated. Furthermore, it may be desirable not to transmit a standard reference signal at all, but to compare the return intelligence-carrying signal with a standard which has been phase-compensated in accordance with the distance between the aircraft and the landing strip receivers and return transmitter.

It should also be noted that a standard reproduction of the airport may be utilized to produce a television signal corresponding to the airport and this signal may be transmitted from the ground to the approaching aircraft after having been suitably modified or associated with other signal components in such manner that the television image reproduced in the aircraft will be effectively tilted from the reproduction originally televised, in accordance with the position and attitude of the approaching aircraft with respect to the airport, as indicated by the position-phased signals received by the spaced ground receivers around the airport.

This may be accomplished in a number of ways. For example, the correlated signal carrying intelligence as to the angular coordinates of the ground receivers with respect to the approaching aircraft transmitting antennae may be utilized to effectively vary the sweep voltages applied to the cathode ray tubes in the aircraft for effectively tilting the television image reproduced of the standard reproduction of the airport. For example, vacuum tubes might be substituted for gain controls 586, 587, 622 and 623, and the grid bias thereof controlled in accordance with the spacing between position pulses in the correlated intelligence-carrying signal, which correspond to known locations of known spacing.

Furthermore, the correlated signal carrying intelligence as to the angular coordinates of the receivers with respect to the airport may servo-control the position of a television camera with respect to a reproduction or three-dimensional model of the airport within the field of view of the camera so that the relative position of the television camera with respect to the reproduction of the airport is maintained exactly the same as the relative position of the approaching aircraft with respect to the airport and the television camera can televise a picture of the reproduction of the airport and transmit same to the approaching aircraft where it can be reproduced by cathode ray tube means in the manner hereinbefore described.

It should be noted that these variations do not depart from the fundamental invention which comprises the position phase modulation of radiated signals which may be received at a plurality of points and then correlated so as to produce a signal or signals carrying intelligence corresponding to relative angular coordinates of reception points. This intelligence may then be transmitted directly back to the approaching aircraft or utilized as just described in modifying a television signal of a reproduction of the airport or in causing a television signal of a reproduction of the airport to be produced from a relative attitude and position corresponding to the approaching aircraft and the airport. These signals are, of course, then transmitted to the aircraft for visual reproduction in the usual manner.

The effective comparing, correlating and intelligence-carrying signal-producing means described and illustrated herein is more specifically and completely described, illustrated and claimed in copending application of William W. Brockway, Serial No. 150,683, filed March 20, 1950, and complete details thereof can be found in said copending application.

It is apparent that the systems described herein are not limited necessarily to landing aircraft, but may be used wherever beacon warning devices are required. Navigation of boats in restricted areas, such as harbors or rivers, is possible during adverse weather conditions with proper application of the systems described herein. A cross-country radio beacon system is also possible, as well as an aircraft-to-aircraft warning system.

With very little additional translating equipment at the radiating source (aircraft or boat) distances between beacon receiver positions and the radiating source may be directly indicated by phase shift rate of synchronizing signal.

Moving objects within an area outlined by beacon receivers may be linked to the ultrahigh-frequency ground transmitter equipment by direct transmission line or a radio channel to provide a moving beacon. Thus, the position of an aircraft upon the landing area or within the landing area may be observed by another approaching aircraft.

By installing the pulse-creating and ultrahigh-frequency transmitting equipment in the aircraft, a warning means may be provided between aircraft. Still further, in training operations, wherein an instructor is located on the ground and his student is in the aircraft, the pulses received on the aircraft in the form illustrated at 542 in Fig. 13 may be transmitted to the ground and reproduced there by the apparatus of the type shown in Figs. 13 and 14 to produce an indication to the instructor of the landing area as actually viewed by the student. A supplementary radio voice communication channel between the instructor and the student may be employed by the instructor to carry instructions to the student while observing the pattern of the landing area on his cathode ray screen located on the ground. In other words, in this modified system, the instructor, although located on the ground, views the landing area from the same perspective as does the student.

Frequency modulation may also be employed, as only phase shift of a demodulated signal is used to determine position.

The examples described and illustrated herein are exemplary only and are not intended to limit the scope of this invention, which is to be interpreted in the light of the appended claims only.

We claim:

1. A Hertzian wave space-scanning system comprising: a mobile station including means for generating and transmitting Hertzian waves into a selected space segment including two separable components arranged to scan the space segment through two angularly related scanning paths, each of said components being phase-modulated at any point in the space segment in accordance with the spatial coordinates of that point with respect to the transmitting means; a plurality of Hertzian wave receiving means located at predetermined positions; means for detecting, separating, and correlating the received separable components and producing a video signal carrying intelligence identifying the relative positions of the receivers; means for transmitting the video signal carrying intelligence identifying the relative positions of the receivers to the mobile station; and means on the mobile station for converting the video signals into a visual representation of the receiver locations in perspective relationship from the attitude of the mobile station.

2. A system of the character stated in claim 1 wherein the two separable components scan through mutually perpendicular paths and in which the video signal carrying intelligence identifying the relative positions of the receivers is of a pulse-position modulated type.

3. A system of the character stated in claim 1 wherein a third, separable, non-angularly phase-modulated, standard reference signal is also directed from the transmitting means into the selected space segment and in which the video signal carrying intelligence identifying the relative positions of the receivers is a pulse-modulated signal produced from the standard, non-angularly phase-modulated, reference signal and the intelligence-carrying signal.

4. A system of the character stated in claim 1 wherein one of the phase-modulated components is of a frequency corresponding to the image repetition frequency of a television image to be reproduced and the other phase-modulated component is of a frequency corresponding to the line frequency of such television image, and wherein the means for converting the video signal into a visual representation includes a cathode ray tube.

5. A system of the character stated in claim 1 wherein the means on the mobile station for converting the video signals into a visual representation includes means for visually and binocularly observing said visual representation with ocular focus and convergence corresponding to ocular infinity viewing conditions and in a manner preserving similitude of viewing angles.

6. A system of the character stated in claim 1 wherein said correlating means includes means for producing relatively low-frequency, long duration, gating pulses positioned in accordance with the phase of one of the separable components and means for producing relatively high-frequency, short duration pulses positioned in accordance with the phase of the other of the separable components and electronic gating means for effectively selecting pulses from one of said components under the control of the gating pulses whereby the position of the gating pulses corresponds to one of the angular coordinates of the receivers and the position of the controlled pulses within the period of the gating pulses corresponds to the other of the angular coordinates of the receivers.

7. A system for enabling aircraft to land under conditions of restricted visibility and for supplying the pilot with a perspective view of selected points for identifying a landing field, comprising: airborne means including directional antennae for generating and transmitting a complex Hertzian wave pattern into a selected space segment including two separable components arranged to scan the space segment through two angularly related scanning paths; a plurality of Hertzian wave receiving means located at predetermined positions with respect to a landing field and producing a signal carrying intelligence identifying the relative positions of the receivers; means for transmitting the signal carrying intelligence identifying the relative positions of the receivers to the aircraft; and means on the aircraft for converting the received signals into a visual representation of the receiver locations in perspective relationship from the attitude of the aircraft.

8. A system of the character stated in claim 7 wherein the two separable components are of different frequencies amplitude modulating a carrier wave of the same frequency.

9. A system of the character stated in claim 7 including a television camera and a representation of the landing field in the field of view of the camera; a servo mechanism for controlling the position and orientation of the camera with respect to the representation; means for actuating the servo mechanism in accordance with the correlated components received to position the camera in the aspect of the transmitting antennae carried by the aircraft with respect to the representation; and means for transmitting to the aircraft a video signal produced by the television camera.

10. A system of the character stated in claim 9 wherein cathode ray tube means is provided for converting the video signal into a visual representation.

11. A system for enabling aircraft to land under conditions of restricted visibility and for supplying the pilot with a perspective view of selected points for identifying a landing field, comprsing: airborne means including directional antennae for generating and transmitting a complex Hertzian wave pattern into a selected space segment including two separable components arranged to scan the space segment through two angularly related scanning paths; a plurality of Hertzian wave receiving means located at predetermined positions with respect to a landing field; means for detecting, separating, and correlating the received separable components and producing a combined video signal carrying intelligence corresponding to the angular coordinates of each of the receivers; means for generating a standard video signal corresponding to a plan view of the receiver locations; means controlled by the intelligence-carrying signal resulting from the correlation of the components received by the receivers arranged to modify the standard video signal in accordance with the angular relation of the antennae to the receivers; means for transmitting the modified video signal to the aircraft; and means on the aircraft for converting the video signals into a visual representation of the receiver locations.

12. A system of the character stated in claim 11 wherein said correlating means includes means for producing relatively low-frequency, long duration, gating pulses positioned in accordance with the phase of one of the separable components and means for producing relatively high-frequency, short duration pulses positioned in accordance with the phase of the other of the separable components and electronic gating means for effectively selecting pulses from the high-frequency pulses under the control of the low-frequency, gating pulses whereby gating pulse position corresponds to receiver angular position in one direction and high-frequency pulse position relative to gating pulse position corresponds to receiver angular position in the other direction.

13. A system of the character stated in claim 14 wherein means carried by the aircraft for converting the video signals into a visual representation of the receiver locations is of a cathode ray tube type and also includes means for visually and binocularly observing said visual representation under conditions simulating infinity ocular viewing.

14. A system for enabling aircraft to land under conditions of restricted visibility and for supplying the pilot with a perspective view of selected points identifying a landing field, comprising: airborne means for generating and transmitting from directional antennae fixedly positioned with respect to two reference planes a complex Hertzian wave pattern into selected space segment, said wave pattern including at least two separable components, each being phase-modulated at any point in the space segment in accordance with the angular coordinates of that point with respect to the transmitting antennae and the two reference planes, said complex Hertzian wave pattern also including a third, separable, non-phase-modulated, standard, reference signal; a plurality of Hertzian wave receiving means located at predetermined positions with respect to a landing field whereby each receiver means receives differently phased components in accordance with the position of the receivers in the space segment; means for detecting, separating, and correlating the received standard reference signal and phase-modulated, separable components and producing a combined video signal carrying intelligence corresponding to the angular coordinates corresponding to each of the receivers; means for transmitting the video signal to the aircraft; and means on the aircraft for converting the video signal into a visual representation of the receiver locations.

15. A system of the character stated in claim 14 wherein the median of the selected space segment is virtually coaxial with the longitudinal axis of the aircraft and wherein the means for converting the video signal into a visual representation is of a cathode ray tube type.

16. A system of the character stated in claim 14 wherein the two separable, phase-modulated components are angularly phase-modulated in mutually perpendicular directions so that at any point in the space segment the relative phase displacement is in accordance with the angular coordinates of that point with respect to the two reference planes.

17. A system of the character stated in claim 16 wherein the median of the selected space segment is virtually coaxial with the longitudinal axis of the aircraft and wherein the means carried by the aircraft for converting the video signal into a visual representation is of cathode ray tube type.

18. In a Hertzian wave space-scanning system, including at least one Hertzian wave sending station provided with directional antennae effectively including a selected three-dimensional space segment therebetween and arranged to effectively scan said selected space segment, the provision of: means for generating and transmitting from directional antennae associated with at least one sending station electromagnetic radiation for producing in a selected space segment effectively included by said antennae Hertzian waves including two separable components phase-modulated in two different directions in accordance with angular coordinates in said directions with respect to the transmitting antennae and two selected reference planes passing therethrough; and at least one Hertzian wave receiving station positioned within the selected space segment at a distance from the sending station arranged to receive and separate the phase-modulated Hertzian wave components and to produce a signal carrying intelligence as to the angular coordinates of the receiving station with respect to the transmitting antennae of the sending station and the selected reference planes.

19. A system of the character stated in claim 18 wherein the two separable, phase-modulated components are angularly phase-modulated in mutually perpendicular directions.

20. A system of the character stated in claim 19 wherein one of the separable, phase-modulated components is of a frequency corresponding to the frame frequency of a television image to be reproduced and the other of the separable, phase-modulated components is of a frequency corresponding to the line frequency of such television image and wherein the correlating means includes means for producing relatively low-frequency, long duration, gating pulses positioned in accordance with the phase of the frame frequency component and means for producing relatively high-frequency, short duration pulses positioned in accordance with the phase of the line frequency component and electronic gating means for effectively selecting certain of the high-frequency pulses under the control of the gating pulses whereby the positions of the gating pulses correspond to the angular coordinates of the receivers in one direction and the positions of the controlled high-frequency pulses within the period of the gating pulses correspond to the angular coordinates of the receivers in the other direction.

WILLIAM W. BROCKWAY.
DOUGLAS G. SHEARER.

References Cited in the file of this patent

UNITED STATES PATENTS

| Number | Name | Date |
|---|---|---|
| 2,027,527 | Hammond | Jan. 14, 1936 |
| 2,062,003 | Hammond | Nov. 24, 1936 |
| 2,307,029 | Elm | Jan. 5, 1943 |
| 2,313,048 | Byrne | Mar. 9, 1943 |
| 2,422,110 | Luck | June 10, 1947 |
| 2,481,410 | Goldsmith | Sept. 6, 1949 |
| 2,515,344 | Guanella et al. | July 18, 1950 |